United States Patent
Saika et al.

(10) Patent No.: US 11,930,273 B2
(45) Date of Patent: Mar. 12, 2024

(54) VIBRATION DAMPING GIMBAL SLEEVE FOR AN AERIAL VEHICLE

(71) Applicant: GoPro, Inc., San Mateo, CA (US)

(72) Inventors: Noriaki Saika, Foster City, CA (US); Christopher Bramley Fruhauf, San Anselmo, CA (US); Daniel Francis Kennedy, San Francisco, CA (US)

(73) Assignee: GoPro, Inc., San Mateo, CA (US)

( * ) Notice: Subject to any disclaimer, the term of this patent is extended or adjusted under 35 U.S.C. 154(b) by 543 days.

(21) Appl. No.: 17/140,405

(22) Filed: Jan. 4, 2021

(65) Prior Publication Data

US 2021/0203826 A1   Jul. 1, 2021

Related U.S. Application Data

(63) Continuation of application No. 15/705,246, filed on Sep. 14, 2017, now Pat. No. 10,911,678, which is a
(Continued)

(51) Int. Cl.
*H04N 23/68* (2023.01)
*B64C 39/02* (2023.01)
(Continued)

(52) U.S. Cl.
CPC ......... *H04N 23/685* (2023.01); *B64C 39/024* (2013.01); *B64D 47/08* (2013.01);
(Continued)

(58) Field of Classification Search
CPC ........ H04N 23/685; H04N 23/60; H04N 5/77; H04N 7/185; B64C 39/024; B64D 47/08;
(Continued)

(56) References Cited

U.S. PATENT DOCUMENTS

| 4,033,541 A | * | 7/1977 | Malueg | ................ | F16F 15/027 |
|---|---|---|---|---|---|
| | | | | | 188/1.11 R |
| 4,498,038 A | | 2/1985 | Malueg | | |

(Continued)

FOREIGN PATENT DOCUMENTS

| CA | 2498259 C | * | 7/2013 | ............ | F16C 11/045 |
|---|---|---|---|---|---|
| KR | 101610802 B1 | * | 4/2016 | ............ | B64D 47/08 |

(Continued)

OTHER PUBLICATIONS

Polymatech, "Viscous Fluid-Filled Damper," 4 Pages, [online] [Retrieved on Jan. 25, 2017] Retrieved from the internet <URL:http://www.polymatech.com.jp/english/b-1.html.>.

*Primary Examiner* — Assres H Woldemaryam
(74) *Attorney, Agent, or Firm* — Young Basile Hanlon & MacFarlane, P.C.

(57) ABSTRACT

A gimbal sleeve for connecting to a camera gimbal may float between a floor surface and a ceiling surface of an aerial vehicle chassis such that the gimbal sleeve has freedom of motion in yaw, pitch, and roll directions relative to the vehicle chassis. The gimbal sleeve may comprise a pair of connection points to the lower dampers on a floor surface of the vehicle chassis. The gimbal sleeve may furthermore comprise a ball joint coupled to a back surface of the vehicle chassis. The connection points include spring forces that enable the gimbal sleeve to return to an equilibrium position in response to external vibrations and reduce the magnitude of vibrations transferred from the aerial vehicle to the gimbal and camera systems.

21 Claims, 16 Drawing Sheets

Related U.S. Application Data continuation-in-part of application No. 15/268,147, filed on Sep. 16, 2016, now Pat. No. 10,150,576.

(60) Provisional application No. 62/395,851, filed on Sep. 16, 2016.

(51) Int. Cl.

| | |
|---|---|
| *B64D 47/08* | (2006.01) |
| *F16C 11/06* | (2006.01) |
| *F16F 13/00* | (2006.01) |
| *F16F 15/02* | (2006.01) |
| *F16F 15/067* | (2006.01) |
| *F16M 11/06* | (2006.01) |
| *F16M 11/10* | (2006.01) |
| *F16M 11/12* | (2006.01) |
| *F16M 11/18* | (2006.01) |
| *F16M 11/20* | (2006.01) |
| *F16M 13/02* | (2006.01) |
| *G03B 15/00* | (2021.01) |
| *G03B 17/56* | (2021.01) |
| *H04N 23/60* | (2023.01) |
| *B64U 10/13* | (2023.01) |
| *B64U 30/20* | (2023.01) |
| *B64U 50/13* | (2023.01) |
| *B64U 101/30* | (2023.01) |
| *H04N 5/77* | (2006.01) |
| *H04N 7/18* | (2006.01) |

(52) U.S. Cl.
CPC ........ *F16C 11/0695* (2013.01); *F16F 13/007* (2013.01); *F16F 15/022* (2013.01); *F16F 15/067* (2013.01); *F16M 11/06* (2013.01); *F16M 11/10* (2013.01); *F16M 11/123* (2013.01); *F16M 11/18* (2013.01); *F16M 11/2071* (2013.01); *F16M 13/02* (2013.01); *F16M 13/022* (2013.01); *G03B 15/006* (2013.01); *G03B 17/561* (2013.01); *H04N 23/60* (2023.01); *B64U 10/13* (2023.01); *B64U 30/20* (2023.01); *B64U 50/13* (2023.01); *B64U 2101/30* (2023.01); *F16M 2200/041* (2013.01); *F16M 2200/044* (2013.01); *H04N 5/77* (2013.01); *H04N 7/185* (2013.01)

(58) Field of Classification Search
CPC ... F16C 11/0695; F16F 13/007; F16F 15/022; F16F 15/067; F16M 11/06; F16M 11/10; F16M 11/123; F16M 11/18; F16M 11/2071; F16M 13/02; F16M 13/022; F16M 2200/041; F16M 2200/044; G03B 15/006; G03B 17/561; B64U 10/13; B64U 30/20; B64U 50/13; B64U 2101/30

See application file for complete search history.

(56) References Cited

U.S. PATENT DOCUMENTS

| | | | |
|---|---|---|---|
| 5,184,521 A | | 2/1993 | Tyler |
| 5,751,578 A | | 5/1998 | Quinn |
| 8,434,950 B1 | * | 5/2013 | Wawro .................. F16M 11/24 |
| | | | 396/419 |
| 2012/0316685 A1 | | 12/2012 | Pettersson |
| 2013/0105619 A1 | | 5/2013 | Buscher |
| 2015/0336678 A1 | * | 11/2015 | Cassagne ............. F16C 23/046 |
| | | | 244/54 |
| 2016/0352992 A1 | | 12/2016 | Saika |
| 2017/0045807 A1 | * | 2/2017 | Ye .......................... F16M 11/18 |
| 2017/0081014 A1 | * | 3/2017 | Stock ...................... B64D 9/00 |
| 2017/0131623 A1 | * | 5/2017 | Zhou ................... F16M 11/045 |
| 2017/0291719 A1 | | 10/2017 | Lavine |
| 2018/0007248 A1 | | 1/2018 | Zeise |
| 2018/0067493 A1 | * | 3/2018 | Pilskalns ............. G05D 1/0094 |
| 2018/0079529 A1 | | 3/2018 | Saika |
| 2018/0084173 A1 | | 3/2018 | Saika |
| 2018/0155024 A1 | * | 6/2018 | Lee ...................... B64C 39/024 |
| 2018/0208301 A1 | * | 7/2018 | Ye ........................ B64C 27/006 |
| 2018/0346148 A1 | * | 12/2018 | Zhang .................. B64C 39/024 |
| 2019/0049060 A1 | * | 2/2019 | Ma ....................... F16M 11/123 |

FOREIGN PATENT DOCUMENTS

| | | | | |
|---|---|---|---|---|
| KR | 101644151 B1 | * | 8/2016 | ........... B64C 39/024 |
| KR | 20160103586 A | * | 9/2016 | ............... B64D 1/14 |
| WO | WO-2010130127 A1 | * | 11/2010 | .............. F16M 11/04 |
| WO | WO-2017179160 A1 | * | 10/2017 | ............... F16F 15/08 |
| WO | WO-2018214162 A1 | * | 11/2018 | ............. B64D 47/08 |

\* cited by examiner

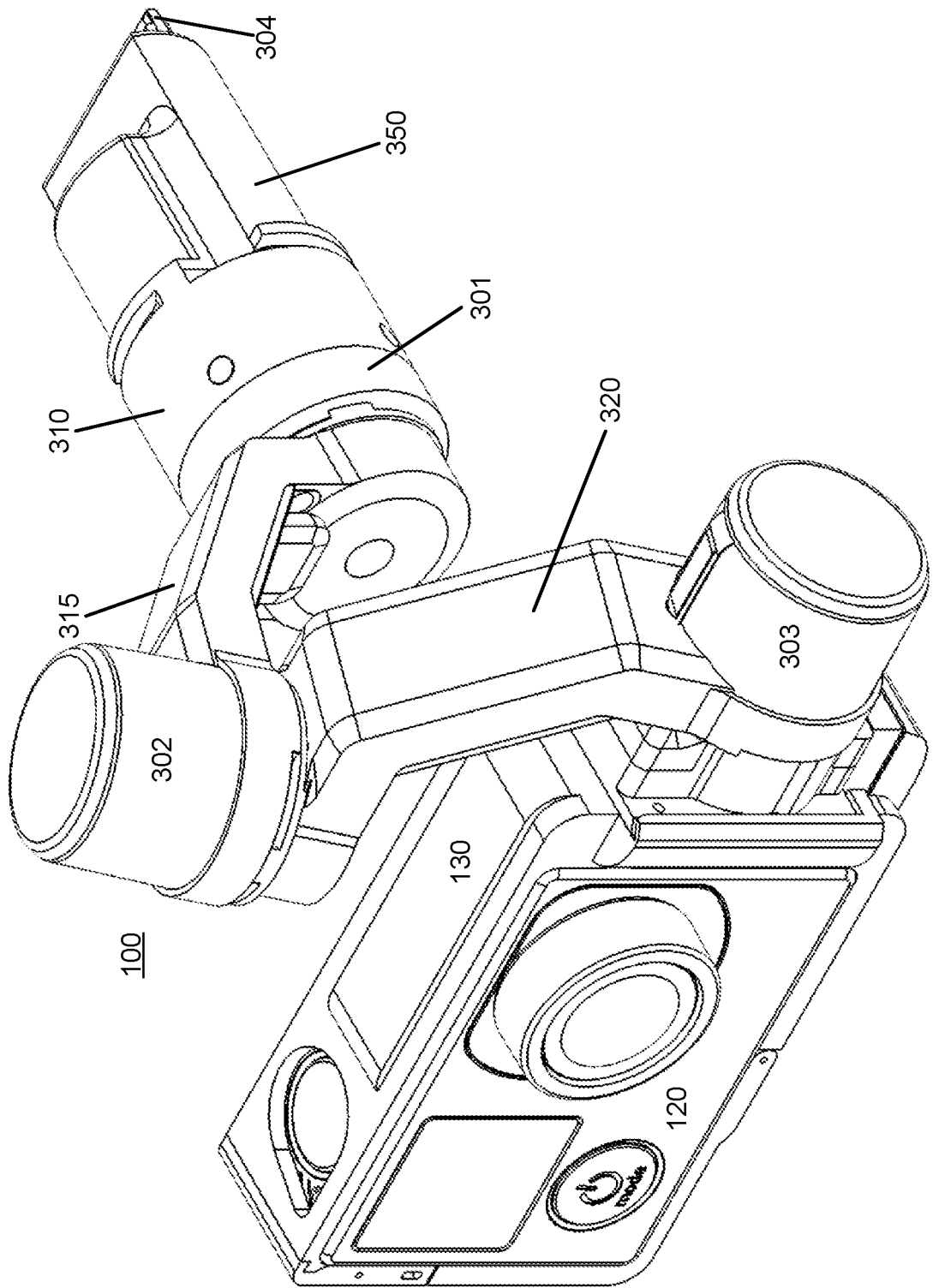

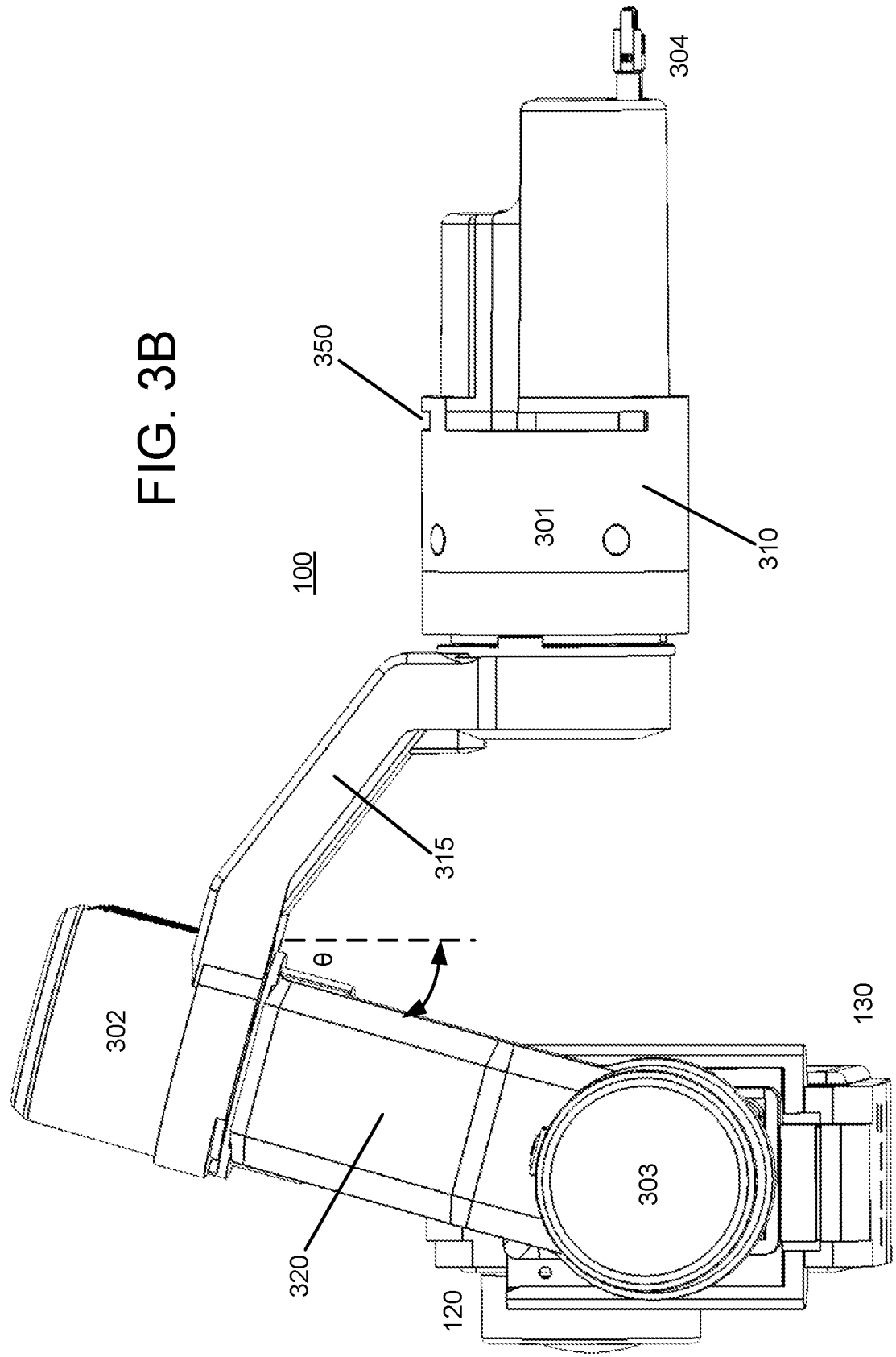

VIBRATION DAMPING GIMBAL SLEEVE FOR AN AERIAL VEHICLE

CROSS REFERENCE TO RELATED APPLICATION(S)

This application is a continuation of U.S. patent application Ser. No. 15/705,246, filed Sep. 14, 2017, which claims the benefit of U.S. Provisional Application No. 62/395,851 filed on Sep. 16, 2016, which is incorporated by reference herein. This application is also a continuation-in-part of U.S. patent application Ser. No. 15/268,147 filed on Sep. 16, 2016, now U.S. Pat. No. 10,150,576, which is incorporated by reference herein.

BACKGROUND

Field of Art

The disclosure generally relates to the field of aerial photography and in particular to a vibration damping mechanism in an aerial vehicle carrying a camera.

Description of Art

Unstabilized videos taken from a camera attached to a flying aerial vehicle are often so shaky and unstable that they are unusable. Additionally, even if the video can be digitally stabilized in post-processing, vibrations of the aerial vehicle during flight can introduce unwanted noise into the audio channel. An electronic gimbal between the aerial vehicle and the camera can provide some level of mechanical stabilization by compensating for small changes in the position and orientation of the camera. However, a conventional electronic gimbal alone cannot react quickly enough to sufficiently compensate for high frequency vibrations.

BRIEF DESCRIPTION OF THE DRAWINGS

The disclosed embodiments have advantages and features which will be more readily apparent from the detailed description, the appended claims, and the accompanying figures (or drawings). A brief introduction of the figures is below.

Figure (FIG. 1 is a functional block diagram illustrating an example configuration of a camera mounted on a gimbal which is, in turn, mounted to a mount platform.

FIGS. 3A and 3B illustrate an example of a gimbal and camera.

DETAILED DESCRIPTION

Figure 1:
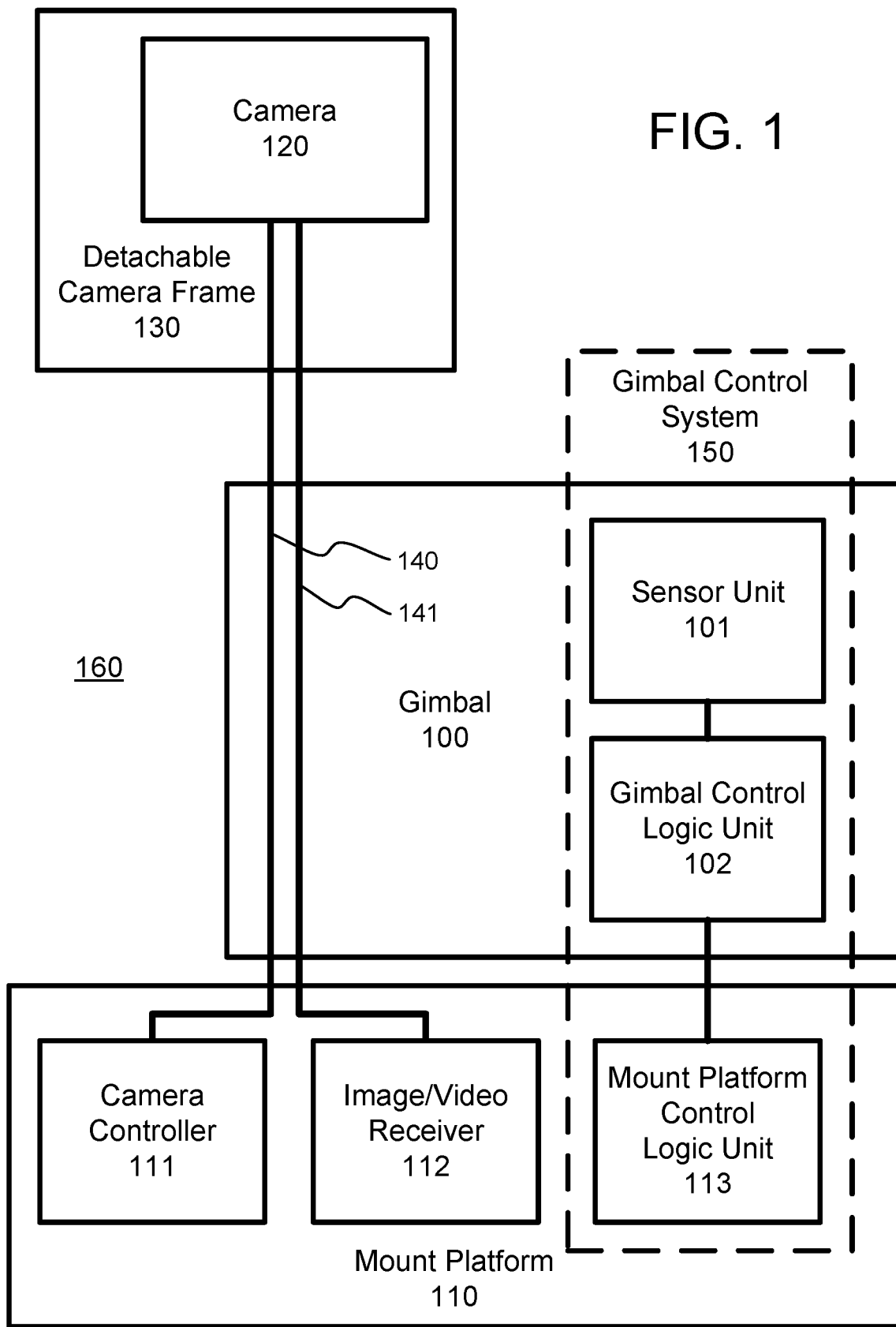

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

An aerial vehicle may comprise a floor surface having a pair of lower dampers and a ceiling surface having a pair of upper dampers. The ceiling surface may be substantially parallel to the floor surface. A gimbal sleeve may at least partially extend between the floor surface and the ceiling surface. The gimbal sleeve may comprise a mount connector to connect to a gimbal. The gimbal sleeve may float between the floor surface and the ceiling surface such that the gimbal sleeve has freedom of motion in yaw, pitch, and roll directions relative to the floor surface and the ceiling surface. The gimbal sleeve may comprise a pair of connection points to the lower dampers and a pair of connection points to the upper dampers. A gimbal may be connected to the mount connector of the gimbal sleeve.

In a particular embodiment, the gimbal sleeve may include a tube structured to couple with a gimbal connector. The tube may comprise a substantially cylindrical shape and may have a longitudinal axis substantially parallel to the floor surface and the ceiling surface. Upper flanges may extend in opposite directions from an outer surface of the tube and may be aligned along an upper axis which is substantially perpendicular to the longitudinal axis of the tube and substantially parallel to the floor surface and the ceiling surface. The upper axis may be offset in an upper direction from the longitudinal axis of the tube towards the ceiling surface. Lower flanges may extend in opposite directions from the outer surface of the tube and may be aligned along a lower axis. The lower axis may be substantially perpendicular to the longitudinal axis of the tube and substantially parallel to the floor surface and the ceiling surface. The lower axis may be offset in a lower direction from the longitudinal axis of the cylindrical towards the floor surface. Upper pins may extend from the respective upper flanges towards the floor surface and mate with the pair of lower dampers. Lower pins may extend from the pair of lower flanges towards the ceiling surface and may mate with the pair of upper dampers. Upper springs may be positioned around the pair of upper pins and the pair of lower dampers. The upper springs may apply a spring force between the pair of upper flanges and the floor surface. Lower springs may be positioned around the pair of lower pins and the pair of upper dampers. The lower springs may apply a spring force between the pair of lower flanges and the ceiling surface.

In another embodiment, an aerial vehicle includes a partially floating gimbal connector. Here the aerial vehicle includes a vehicle chassis comprising a floor surface, a ceiling surface, a back surface, and a pair of side surfaces. A pair of dampers are coupled to the floor surface of the vehicle chassis. A gimbal sleeve to couple to a gimbal at least partially extends into the vehicle chassis between the floor surface and the ceiling surface. The gimbal sleeve includes a tube structured to couple with a gimbal connector. A pair of attachment points extend in opposite directions from an outer surface of the cylindrical tube towards the side surfaces of the vehicle chassis. A pair of pins extend from the pair of attachment points towards the floor surface and mate with the pair of lower dampers. A ball joint couples an end of the tube to the back surface of the vehicle chassis. A set of tension elements couple each of the attachment points to the ceiling surface, the floor surface, and one of the side surfaces. The tension elements apply a tension force to pull the gimbal sleeve towards an equilibrium position.

Example System Configuration

Figure (FIG. 1 is a functional block diagram illustrating an example system framework. In this example, a gimbal system 160 includes a gimbal 100, an mount platform 110, a camera 120, a detachable frame 130, a camera control connection 140 and a camera output connection 141, and a gimbal control system 150. The gimbal 100 may include a sensor unit 101 and a control logic unit 102. The mount platform 110 may include a camera controller 111, an image/video receiver 112, and a control logic unit 113. The camera 120 may couple to the detachable camera frame 130 which is mounted on the gimbal 100 which is, in turn, coupled to the mount platform 110. The coupling between the gimbal 100 and the mount platform 110 may include a mechanical coupling and a communication coupling. The communication coupling may comprise an electrical connection that enables data to be exchanged between the gimbal 100 and the mount platform 110 such as, for example, control information, audio/visual information, or other data. The camera control connection 140 and a camera output connection 141 may electrically connect the camera 120 to the mount platform 110 for communication coupling. The camera control connection 140 and a camera output connection 141 may be composed of interconnecting electronic connections and data busses in the mount platform 110, gimbal 100, detachable camera frame 130 and camera 120. The gimbal control system 150 may control the gimbal 100 using a combination of a sensor unit 101 and a gimbal control logic unit 102 in the gimbal 100 and a mount platform control logic unit 113 in the mount platform 110.

The camera 120 can include a camera body, one or more a camera lenses, various indicators on the camera body (such as LEDs, displays, and the like), various input mechanisms (such as buttons, switches, and touch-screen mechanisms), and electronics (e.g., imaging electronics, power electronics, metadata sensors, etc.) internal to the camera body for capturing images via the one or more lenses and/or performing other functions. The camera 120 can capture images and videos at various frame rates, resolutions, and compression rates. The camera 120 can be connected to the detachable camera frame 130, which mechanically connects to the camera 120 and physically connects to the gimbal 100. FIG. 1 depicts the detachable camera frame 130 enclosing the camera 120 in accordance with some embodiments. In some embodiments, the detachable camera frame 130 does not enclose the camera 120, but functions as a mount to which the camera 120 couples. Examples of mounts include a frame, an open box, or a plate. Alternately, the detachable camera frame 130 can be omitted and the camera 120 can be directly attached to a camera mount which is part of the gimbal 100.

The gimbal 100 is, in some example embodiments, an electronic three-axis gimbal which rotates a mounted object (e.g., a detachable camera frame 130 connected to a camera 120) in space (e.g., pitch, roll, and yaw). In addition to providing part of an electronic connection between the camera 120 and the mount platform 110, the gimbal may include a sensor unit 101 and a control logic unit 102, both of which are part of a gimbal control system 150. In an embodiment, the gimbal control system 150 detects the orientation of the gimbal 100 and camera 120, determines a preferred orientation of the camera 120, and controls the motors of the gimbal in order to re-orient the camera 120 to the preferred orientation. The sensor unit 101 can include an inertial measurement unit (IMU) which measures rotation, orientation, and acceleration using sensors, such as accelerometers, gyroscopes, and magnetometers. The sensor unit 101 can also contain rotary encoders, which detect the angular position of the motors of the gimbal 100, and a magnetometer to detect a magnetic field, such as the earth's magnetic field. In some embodiments, the sensors of the sensor unit 101 are placed such as to provide location diversity. For example, a set of accelerometers and gyroscopes can be located near the camera 120 (e.g., near the connection to the detachable camera frame 130) and a set of accelerometers and gyroscopes can be placed at the opposite end of the gimbal (e.g., near the connection to the mount platform 110). The outputs of these two sets of sensors can be used by the IMU to calculate the orientation and rotational acceleration of the camera, which can then be output to the gimbal control system 150. In some embodiments, the sensor unit 101 is located on the mount platform 110. In some embodiments, the gimbal control system 150 receives data from sensors (e.g., an IMU) on the mount platform 110 and from the sensor unit 101 of the gimbal 100. In some embodiment the sensor unit 101 does not include an IMU and instead receives position, acceleration, orientation, and/or angular velocity information from an IMU located on the camera 120.

The gimbal control logic unit 102, the sensor unit 101, and the mount platform control logic unit 113 on the mount platform 110 constitute a gimbal control system 150, in one embodiment. As discussed above, the IMU of the sensor unit 101 may produce an output indicative of the orientation, angular velocity, and acceleration of at least one point on the gimbal 100. The gimbal control logic unit 102 may receive the output of the sensor unit 101. In some embodiments, the mount platform control logic unit 113 receives the output of the sensor unit 101 instead of, or in addition to the gimbal control logic unit 102. The combination of the gimbal control logic unit 102 and the mount platform control logic unit 113 may implement a control algorithm which controls the motors of the gimbal 100 to adjust the orientation of the mounted object to a preferred position. Thus, the gimbal control system 150 may have the effect of detecting and correcting deviations from the preferred orientation for the mounted object.

The particular configuration of the two control portions of the gimbal control system 150 may vary between embodiments. In some embodiments, the gimbal control logic unit 102 on the gimbal 100 implements the entire control algorithm and the mount platform control logic unit 113 provides parameters which dictate how the control algorithm is implemented. These parameters can be transmitted to the gimbal 100 when the gimbal 100 is originally connected to the mount platform 110. These parameters can include a range of allowable angles for each motor of the gimbal 100, the orientation, with respect to gravity, that each motor should correspond to, a desired angle for at least one of the three spatial axes with which the mounted object should be oriented, and parameters to account for different mass distributions of different cameras. In another embodiment, the mount platform control logic unit 113 performs most of the calculations for the control algorithm and the gimbal control logic unit 102 includes proportional-integral-derivative controllers (PID controllers). The PID controllers' setpoints (i.e., the points of homeostasis which the PID controllers target) can be controlled by the mount platform control logic unit 113. The setpoints can correspond to motor orientations or to the orientation of the mounted object. In some embodiments, either the gimbal control logic unit 102 or the mount platform control logic unit 113 may be omitted, and the control algorithm may be implemented entirely by the other control logic unit.

The mount platform 110 is shown electrically and mechanically connected to the gimbal 100. The mount platform 110 may be, for example, an aerial vehicle, a handheld grip, a land vehicle, a rotating mount, a pole mount, or a generic mount, each of which can itself be attached to a variety of other platforms. The gimbal 100 may be capable of removably coupling to a variety of different mount platforms. The mount platform 110 can include a camera controller 111, an image/video receiver 112, and the aforementioned control logic unit 113. The image/video receiver 112 can receive content (e.g., images captured by the camera 120 or video currently being captured by the camera 120). The image/video receiver 112 can store the received content on a non-volatile memory in the mount platform 110. The image/video receiver 112 can also transmit the content to another device. In some embodiments, the mount platform 110 transmits the video currently being captured to a remote controller, with which a user controls the movement of the mount platform 110, via a wireless communication network.

The gimbal 100 can be electrically coupled the camera 120 and to the mount platform 110 in such a way that the mount platform 110 (e.g., a remote controlled aerial vehicle or a hand grip) can generate commands via a camera controller 111 and send the commands to the camera 120. Commands can include a command to toggle the power the camera 120, a command to begin recording video, a command to stop recording video, a command to take a picture, a command to take a burst of pictures, a command to set the frame rate at which a video is recording, or a command to set the picture or video resolution. Another command that can be sent from the mount platform 110 through the gimbal 100 to the camera 120 can be a command to include a metadata tag in a recorded video or in a set of pictures. In this exemplary configuration, the metadata tag contains information such as a geographical location or a time. For example, a mount platform 110 can send a command through the gimbal 100 to record a metadata tag while the camera 120 is recording a video. When the recorded video is later played, certain media players may be configured to display an icon or some other indicator in association with the time at which the command to record the metadata tag was sent. For example, a media player might display a visual queue, such as an icon, along a video timeline, wherein the position of the visual queue along the timeline is indicative of the time. The metadata tag can also instruct the camera 120 to record a location, which can be obtained via a GPS receiver (Global Positioning Satellite receiver) located on the mount platform 110, the camera 120, or elsewhere, in a recorded video. Upon playback of the video, the metadata can be used to map a geographical location to the time in a video at which the metadata tag was added to the recording.

Signals, such as a command originating from the camera controller 111 or video content captured by a camera 120 can be transmitted through electronic connections which run through the gimbal 100. In some embodiments, telemetric data from a telemetric subsystem of the mount platform 110 can be sent to the camera 120 to associate with image/video captured and stored on the camera 120. A camera control connection 140 can connect the camera controller 111 module to the camera 120 and a camera output connection 141 can allow the camera 120 to transmit video content or pictures to the image/video receiver 112. The electronic connections can also provide power to the camera 120, from a battery located on the mount platform 110. The battery of the mount platform 110 can also power the gimbal 100. In an alternate embodiment, the gimbal 100 contains a battery, which can provide power to the camera 120. The electrical connections between the camera 120 and the gimbal 110 can run through the gimbal 100 and the detachable camera frame 130. The electrical connections between the camera 120 and the mount platform 110 can constitute a daisy chain or multidrop topology in which the gimbal 100 and detachable camera frame 130 act as buses. The electrical connections can implement various protocols such as HDMI (High-Definition Multimedia Interface), USB (Universal Serial Bus), or Ethernet protocols to transmit data. In one embodiment, the camera output connection 141 transmits video data from the camera 120 via the HDMI protocol connection and the camera control connection 140 is a USB connection. In some embodiments, the electrical connection between the camera 120 and the mount platform 110 is internal to the gimbal 100. For example, in one embodiment, a data bus is substantially enclosed in the gimbal 100 and may be exposed at an interface at either end using, for example, a male or female interface connector.

In one embodiment, an electrical signal or mechanical mechanism may enable the gimbal to detect what type of mounting platform 110 it is connected to so that it can configure itself accordingly. For example, a control signal may be sent form the mounting platform 110 to the gimbal 100 identifying the platform type. Alternatively, the gimbal 100 may detect what type of mounting platform 110 it is connected to during usage based on motion or other sensor data. For example, the gimbal 100 can detect whether its motion is more consistent with an aerial vehicle or handheld grip.

Example Aerial Vehicle Configuration

Figure 2:
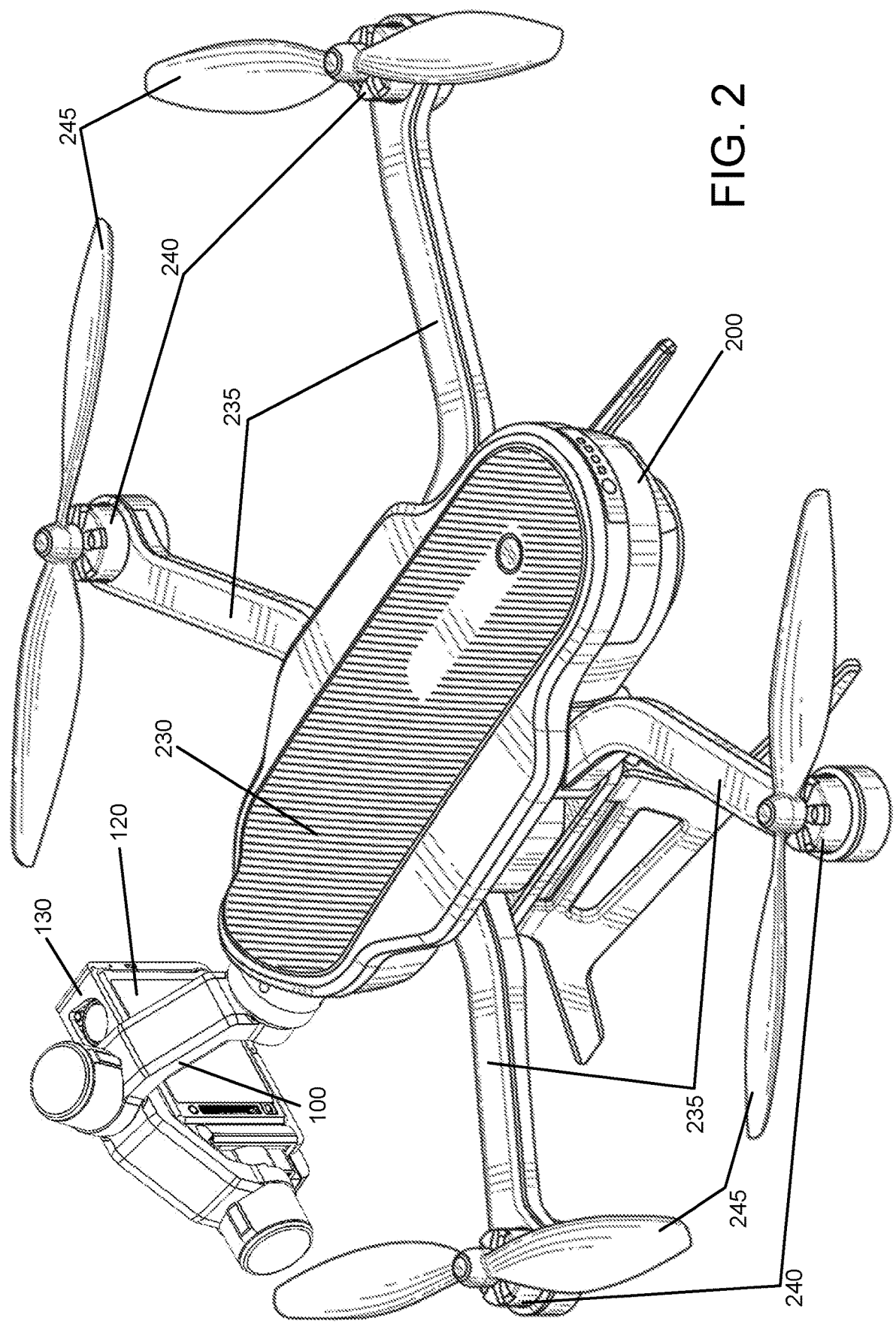
FIG. 2 illustrates an example of a gimbal coupled to a remote controlled aerial vehicle.

FIG. 2 illustrates an embodiment in which the mount platform 110 is an aerial vehicle 200. More specifically, the mount platform 110 in this example is a quadcopter (i.e., a helicopter with four rotors). The aerial vehicle 200 in this example includes housing 230 which encloses a payload (e.g., electronics, storage media, and/or camera), four arms 235, four rotors 240, and four propellers 245. Each arm 235 may mechanically couple with a rotor 240, which in turn couples with a propeller 245 to create a rotary assembly. When the rotary assembly is operational, all the propellers 245 may rotate at appropriate speeds to allow the aerial vehicle 200 lift (take off), land, hover, and move (forward, backward) in flight. Modulation of the power supplied to each of the rotors 240 can control the trajectory and torque on the aerial vehicle 200.

A gimbal 100 is shown coupled to the aerial vehicle 200. A camera 120 is shown enclosed in a removable camera frame 130 which is attached the gimbal 100. The gimbal 100 may be mechanically and electrically coupled to the housing 230 of the aerial vehicle 200 through a removable coupling mechanism that mates with a reciprocal mechanism on the aerial vehicle 200 having mechanical and communicative capabilities. The gimbal 100 can be removed from the aerial vehicle 200. The gimbal 100 can also be removably attached to a variety of other mount platforms, such as a handheld grip, a ground vehicle, and a generic mount, which can itself be attached to a variety of platforms. In some embodiments, the gimbal 100 can be attached or removed from a mount platform 110 without the use of tools.

The connection between the gimbal 100 and the housing 230 aerial vehicle 200 may comprise a floating connection in which the gimbal 100 has some freedom of motion in various directions with respect to the housing 200 of the aerial vehicle 230, thus enabling the gimbal 100 to damp vibrations of the aerial vehicle 200 and improve video stability. A floating connection mechanism for damping vibrations is described in further detail below with respect to FIGS. 5-7.

In an embodiment, the aerial vehicle 200 includes a battery that can be used to provide power to the camera 120, the gimbal 100, or both.

Example Gimbal

FIGS. 3A and 3B, illustrate an exemplary embodiment of the gimbal 100 attached to a removable camera frame 130, which itself is attached to a camera 120. The example gimbal 100 includes a base arm 310, a middle arm 315, a mount arm 320, a first motor 301, a second motor 302, and a third motor 303. Each of the motors 301, 302, 303 can have an associated rotary encoder, which will detect the rotation of the axel of the motor. Each rotary encoder can be part of the sensor unit 101. The base arm 310 can be configured to include a mechanical attachment portion 350 at a first end that allows the gimbal 100 to securely attach a reciprocal component on another mount platform (e.g., an aerial vehicle 200, a ground vehicle, or a handheld grip), and also be removable. The base arm 310 also includes the first motor 301. The base arm 310 may mechanically couple to the middle arm 315. A first end of the middle arm 315 may mechanically couple to the first motor 301. A second end of the middle arm 315 may mechanically couple to the second motor 302. A first end of the mount arm 320 may mechanically couple to the second motor 302. The second end of the mount arm 320 may mechanically couple to the third motor 303 which may mechanically couple to the camera frame 130. Within the camera frame 130, the camera 120 may be removably secured.

The gimbal 100 may be configured to allow for rotation of a mounted object in space. In the embodiment depicted in FIG. 3A and FIG. 3B, the mounted object is a camera 120 to which the gimbal 100 is mechanically coupled. The gimbal 100 may allow for the camera 120 to maintain a particular orientation in space so that it remains relatively steady as the platform to which it is attached moves (e.g., as an aerial vehicle 200 tilts or turns during flight). The gimbal 100 may have three motors, each of which rotates the mounted object (e.g., the camera 120) about a specific axis of rotation. Herein, for ease of discussion, the motors are numbered by their proximity to the mount platform 110 (i.e., the first motor 301, the second motor 302, and the third motor 303).

The gimbal control system 150 may control the three motors 301, 302, and 303. After detecting the current orientation of the mounted object, via the sensor unit 101, the gimbal control system 150 can determine a preferred orientation along each of the three axes of rotation (i.e., yaw, pitch, and roll). The preferred orientation may be used by the gimbal control system 150 to compute a rotation for each motor in order to move the camera 120 to the preferred orientation or keep the camera 120 in the preferred orientation. In one embodiment, the gimbal control system 150 has a preferred orientation that is configured by the user. The user can input the preferred orientation of the camera 120 with a remote controller. For example, the user can input the preferred orientation with a remote controller for a mounting platform 110, which sends the preferred orientation for the camera 120 to the mounting platform 110 (e.g., aerial vehicle 200) through a wireless network, which then provides the preferred orientation to the gimbal control system 150. In some example embodiments, an orientation can be defined relative to the ground, so that the yaw, pitch, and roll of the camera remain constant relative to the ground. In some embodiments, certain axes of rotation can be unfixed. That is, an unfixed axis of rotation may not be corrected by the gimbal control system 150, but rather may remain constant relative to the aerial vehicle 200. For example, the yaw of the camera 120 can be unfixed, while the roll and the pitch are fixed. In this case, if the yaw of the aerial vehicle 200 changes the yaw of the camera 120 will likewise change, but the roll and the pitch of the camera 120 will remain constant despite roll and pitch rotations of the aerial vehicle 200.

In some example embodiments, bounds of rotation can be defined which limit the rotation along certain axes relative to the connection between the gimbal 110 and the mount platform 110. For example, if $\alpha_{max}$ and $\alpha_{min}$ are the relative maximum and minimum values for the yaw of the camera 120 relative to the mount platform 110, then if the aerial vehicle 200 is oriented at a yaw of $\alpha_{av}$ degrees, the preferred yaw of the camera $\alpha_c$ may be chosen by the gimbal control system 150 so that the angle $\alpha_c$ is between the angles $(\alpha_{min}+\alpha_{av})$ and $(\alpha_{max}+\alpha_{av})$. Similar maximum and minimum values can be defined for the pitch and roll. The maximum and minimum for each of the relative angles can be defined such that the viewing angle of the camera 120 is not obstructed by the gimbal 100 and/or the mount platform 110 at any angle within the valid bounds. In some embodiments, the preferred orientation of the camera 120 is defined using one or more tracking algorithms, which will be further discussed herein.

The axis to which each motor corresponds can depend on the mount platform 110 to which the gimbal 100 is attached. For example, when attached to the aerial vehicle 200, the first motor 301 can rotate the mounted object about the roll axis, the second motor 302 can rotate the mounted object about the yaw axis and the third motor 303 can rotate the mounted object about the pitch axis. However, when the same gimbal 100 is attached to a handheld grip, the motors correspond to different axes: the first motor 301 can correspond to yaw axis, and the second motor 302 can corresponds to roll axis, while the third motor 303 can still corresponds to pitch axis.

In some embodiments, each of the three motors 301, 302, 303 is associated with an orthogonal axis of rotation. However, in other embodiments, such as the embodiment depicted in FIG. 3A and FIG. 3B the motors 301, 302, 303 of the gimbal 100 are not orthogonal. A gimbal 100 in which the motors are not orthogonal may have at least one motor that rotates the mounted object about an axis which is not orthogonal to the axis of rotation of the other motors. In a gimbal 100 in which the motors are not orthogonal, operation of one motor of the gimbal 100 can cause the angle of the camera 120 to shift on the axis of another motor. In the example embodiment shown in FIG. 3A and FIG. 3B, the first motor 301 and the third motor 303 have axes of rotation that are orthogonal to each other, and the second motor 302 and the third motor 303 are orthogonal, but the first motor 301 and second motor 302 are not orthogonal. Because of this configuration, when the gimbal 100 is coupled to the aerial vehicle 200 and the aerial vehicle 200 is level, operation of the first motor 301 may adjust only the roll of the camera 120 and the third motor 303 may adjust only the pitch of the camera 120. The second motor 302 may adjust the yaw primarily, but also may adjust the pitch and roll of the camera 120. Suppose for the purpose of example, the gimbal 100 is attached to the aerial vehicle 200 and the camera 120 is initially oriented at a pitch, yaw, and roll of 0° and that the axis of the second motor 302 is orthogonal to the axis of the third motor 303 and forms an angle of θ degrees with the vertical axis, as depicted in FIG. 3B. In FIG. 3B, the angle θ is measured clockwise, and is about 16°. A rotation of φ degrees (where −180°≤φ≤180° by the second motor 302 may also change the pitch, p, of the camera 120 top=(|φ|*θ)/90° where a pitch greater than 0 corresponds to the camera being oriented beneath the horizontal plane (i.e., facing down). The rotation of the second motor 302 by φ degrees may also change the roll, r, of the camera 120 to r=θ*(1|φ−90°|/90°) in the case where −90°≤φ≤180° and the roll will change to r=−(θ*φ/90°−θ in the case where −180°<φ<−90°. The change in the yaw, y, of the camera 120 may be equivalent to the change in angle of the second motor 120 (i.e., y=φ.

A non-orthogonal motor configuration of the gimbal 100 can allow for a larger range of unobstructed viewing angles for the camera 120. For example, in the embodiment shown in FIG. 3A and FIG. 3B, the pitch of the camera 120 relative to the connection of the gimbal 100 to the mount platform 110 (e.g., aerial vehicle 200) can be about 16° higher without the camera's frame being obstructed (i.e., without the motor appearing in the image captured by the camera) than it could with an orthogonal motor configuration. In some embodiments, the second motor 302 may not be identical to the other two motors 301, 303. The second motor 302 can be capable of producing a higher torque than the other two motors 301, 303. In another embodiment, a different one of the motors 301, 302, 303 may be capable of producing a higher torque than the other two motors. In another embodiment, all three motors 301, 302, 303 may be capable of producing different amounts of torque. In yet another embodiment, all three motors 301, 302, 303 may be capable of producing substantially similar torques.

A larger value of θ (the angle between the second motor 302 and the axis orthogonal to the rotational axes of the other two motors) in a non-orthogonal motor configuration can provide a larger range of viewing angles for the mounted camera 120, but a larger θ will result in a higher maximum torque than a comparable orthogonal motor configuration. Thus, embodiments in which the motors are not orthogonal can implement a value of θ in which the two design considerations of a large viewing angle for the camera 120 and the torque from the motors are optimized. Consequently, the choice of θ will depend on many factors, such as the targeted price point of the gimbal 100, the type of cameras supported, the desired use cases of the gimbal, the available motor technology, among other things. It is noted that by way of example, θ can be between 0°≤θ≤30°. In another embodiment, θ can be between 5°≤θ≤30°. Other ranges are also possible.

The gimbal 100 can support a plurality of different cameras with different mass distributions. Each camera can have a corresponding detachable camera frame (e.g., camera 120 corresponds to the detachable camera frame 130), which secures the camera. A detachable camera frame 130 may have an electrical connector, or a multiplicity of electrical connectors, which couple to the gimbal 100 and an electrical connector, or a multiplicity of electrical connectors, which couple to the camera 120. Thus, the detachable camera frame 130 may include a bus for sending signals from the camera to the gimbal 100, which can, in some cases, be routed to the mount platform 110. In some embodiments, each detachable camera frame has the same types of electrical connectors for coupling to the gimbal 100, but the type of electrical connector that connects to the camera is specific to the type of camera. In another embodiment, the detachable camera frame 130 provides no electronic connection between the camera 120 and the gimbal 100, and the camera 120 and gimbal 100 are directly electrical connected (e.g., via a cable). In some embodiments, the gimbal 100 does not contain a bus and the camera 120 and the mount platform 110 communicate via a wireless connection (e.g., Bluetooth or WiFi).

In some example embodiments, the gimbal 100 may have a mount connector 304 (shown in FIG. 3B, but not in FIG. 3A) which allows the gimbal 100 to electronically couple to the mount platform 110 (e.g., the aerial vehicle 200). The mount connector 304 can include a power connection which provides power to the gimbal 100 and the camera 120. The mount connector 304 can also allow communication between the sensor unit 101 and the gimbal control logic unit 102 on the gimbal 100 and the mount platform control logic unit 113 on the mount platform 110. In some embodiments, the mount connector 304 electrically connects to the camera 120 via busses (e.g., a camera control connection 140 and a camera output connection 141) which allow communication between the mount platform 110 and the camera 120.

The gimbal 100 also can couple mechanically to a mount platform 110 such as the housing 230 of the aerial vehicle 110 via a mechanical attachment portion 350. In an embodiment, the gimbal 100 is a modular device that can be quickly and easily connected and disconnected from a mounting platform 350 (e.g., aerial vehicle 200, handheld grip, rotating mount, etc.). For example, in one embodiment, mechanical attachment portion 350 comprises a quick-release mechanism or other mechanism that does not require tools. The mechanical attachment portion 350 can be part of the base arm 310. The mechanical attachment portion 350 can include a mechanical locking mechanism to securely attach a reciprocal component on a mount platform 110 (e.g., an aerial vehicle 200, a ground vehicle, an underwater vehicle, or a handheld grip). The example mechanical locking mechanism shown in FIGS. 3A and 3B includes a groove with a channel in which a key (e.g., a tapered pin or block) on a reciprocal component on a mount platform 110 can fit.

The gimbal 100 can be locked with the mount platform 110 in a first position and unlocked in a second position, allowing for detachment of the gimbal 100 from the mount platform 110. The mechanical attachment portion 350 may mechanically connect to a reciprocal component on a mount platform 110 in which the mechanical attachment portion 350 may be configured as a female portion of a sleeve coupling and where the mount platform 110 may be configured as a male portion of a sleeve coupling. Alternatively, the mechanical attachment portion 350 may be configured as a male portion of a sleeve coupling and the mount platform may be configured a female portion of a sleeve coupling. The connection mechanism is described in further detail below with respect to FIGS. 5-7.

If the gimbal 100 supports multiple different cameras of differing mass distributions, the differences in mass and moments of inertia between cameras might cause the gimbal 100 to perform sub-optimally. A variety of techniques are suggested herein for allowing a single gimbal 100 to be used with cameras of different mass distributions. The detachable camera frame 130 can hold the camera 120 in such a way that the detachable frame 130 and camera 120 act as a single rigid body. In some example embodiments, each camera which can be coupled to the gimbal 100 has a corresponding detachable frame, and each pair of camera and frame have masses and moments of inertia which are approximately the same. For example, if $m_{ca}$ and $m_{fa}$ are the masses of a first camera and its corresponding detachable frame, respectively, and if $m_{cb}$ and $m_{fb}$ are the masses of a second camera and its corresponding detachable frame, then, $m_{ca}+m_{fa} \approx m_{cb}+m_{fb}$. Also, $I_{ca}$ and $I_{fa}$ are the matrices representing the moments of inertia for the axes around about which the first camera rotates for the first camera and the corresponding detachable frame, respectively. In addition, $I_{cb}$ and $I_{fb}$ are the corresponding matrices for the second camera and the corresponding detachable frame, respectively. Thereafter, $I_{ca}+I_{fa} \approx I_{cb} I_{fb}$, where "+" denotes the matrix addition operator.) Since the mounted object which is being rotated by the gimbal is the rigid body of the camera and detachable camera frame pair, the mass profile of the mounted object does not vary although the mass profile of the camera itself does. Thus, by employing detachable camera frames e.g., 130, with specific mass profiles a single gimbal 100 can couple to a multiplicity of cameras with different mass profiles.

In alternate embodiments, the mass profile of the camera 120 and detachable frame 130 pair is different for each different type of camera, but control parameters used in the control algorithms, implemented by the gimbal control system 150, which control the motors, are changed to compensate for the different mass profiles of each pair camera and detachable camera frame. These control parameters can specify the acceleration of a motor, a maximum or minimum for the velocity of a motor, a torque exerted by a motor, a current draw of a motor, and a voltage of a motor. In one embodiment, the camera 120 and/or the camera frame 130 is communicatively coupled to either the gimbal 100 or the mount platform 110, and upon connection of a camera 120 to the gimbal 100 information is sent from the camera 120 to the gimbal control system 150 which initiates the update of control parameters used to control the motors of the gimbal 100. The information can be the control parameters used by the gimbal control system 150, information about the mass profile (e.g., mass or moment of inertia) of the camera 120 and/or detachable camera mount 130, or an identifier for the camera 120 or the camera mount 130. If the information sent to the gimbal control system 150 is a mass profile, then the gimbal control system 150 can calculate control parameters from the mass profile. If the information is an identifier for the camera 120 or the detachable camera frame 130, the gimbal control system 150 can access a non-volatile memory which stores sets of control parameters mapped to identifiers in order to obtain the correct set of control parameters for a given identifier.

In some embodiments, the gimbal 100 may be capable of performing an auto-calibration sequence. This auto-calibration sequence may be performed in response to a new camera 120 being connected to the gimbal 100, in response to an unrecognized camera 120 being attached to the gimbal 100, in response to a new mount platform 110 being connected to the gimbal, or in response to an input from a user. Auto-calibration may involve moving the gimbal 100 to a number of set orientations. The speed at which the gimbal re-orients the camera 120 can be measured and compared to an expected speed. The torque exerted by the motor, the current draw of the motor, the voltage used to motor can be adjusted so that the movement of the gimbal 100 is desirable.

In some embodiments, the movement characteristics of the gimbal 100 may be adjusted according the type of mount platform 110 that the gimbal 100 is connected to. For example, each type of mount platform 110 can specify the maximum rotation speed of the gimbal 100, the maximum torque applied by the motors 301, 302, 303, or the weight given to the proportional, integral, and derivative feedback components used in a PID controller used to control a motor 301, 302, or 303. In some embodiments, the motor power used for motion damping is determined based on the type of connected mount platform 110. Furthermore, the gimbal 100 may operate within different angle ranges along each of the roll, pitch, and yaw dimensions depending on the mount platform 110. For example, the possible angles of rotation may include a wider range when the gimbal 100 is mounted to a handheld grip than when it is mounted to an aerial vehicle.

Furthermore, as a safety and self-protection parameter, in one embodiment a motor power timeout may be triggered when excessive resistance is detected on any motor axis for a given period of time. Furthermore, for power savings, the gimbal 100 may cut power to the motors when it detects a lack of movement indicating that it is not in use. Power may be re-applied automatically when the gimbal 100 detects that it is in use again. Additionally, in one embodiment, the gimbal 100 can only be powered on when it detects that is attached to both a compatible camera 120 and a compatible mounting platform 110 and when the mounting platform 110 can provide sufficient power to both devices.

In one embodiment, the gimbal control system 150 may obtain periodic firmware updates. In one embodiment, the gimbal control system 150 may receive a firmware update via an attached handheld grip. For example, the handheld grip may receive the update via a connection (e.g., USB) to a computing device and the update may be flashed to the gimbal control system 150 via the handheld grip. In another embodiment, the gimbal control system 150 may be updated via a connected camera 120. In this case, the camera 120 may receive an update via a connected mobile application on a mobile device and subsequently transfer the update to the gimbal control system 150. In yet another embodiment, when the gimbal 100 is being used with an aerial vehicle, an update may be received on a remote control operating the aerial vehicle. The remote control alerts the user that an update is available and then wirelessly transmits the update to the aerial vehicle, which in turn sends the update to the gimbal 100. In other embodiments, firmware updates may be received via other mounting platforms 120 or via other wired or wireless connections.

In an embodiment, the gimbal 100 is constructed of a highly durable (e.g., to withstand impact) and wear-resistant material for surface finishing. Furthermore, the gimbal 100 may be constructed of materials rigid enough to limit sensor errors. Furthermore, the gimbal may be substantially waterproof and flameproof In one embodiment, the gimbal 100 has dimensions in the range of approximately 80-100 mm in width, 70-90 mm in depth, and 80-100 mm in height.

Damping Connection

Figure 4:
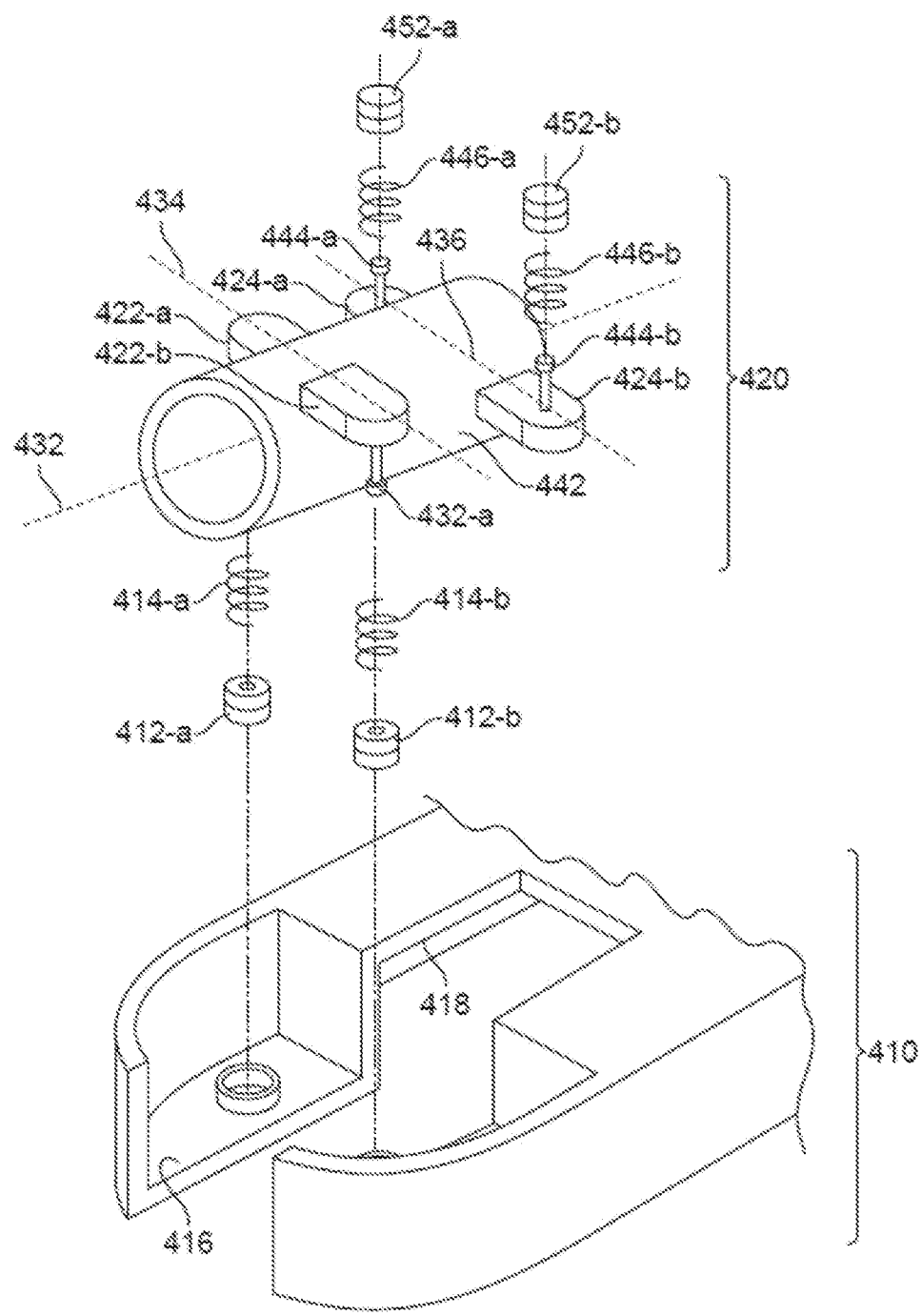
FIG. 4 is an exploded view of an embodiment of a connection mechanism between an aerial vehicle and a gimbal.
Figure 5:
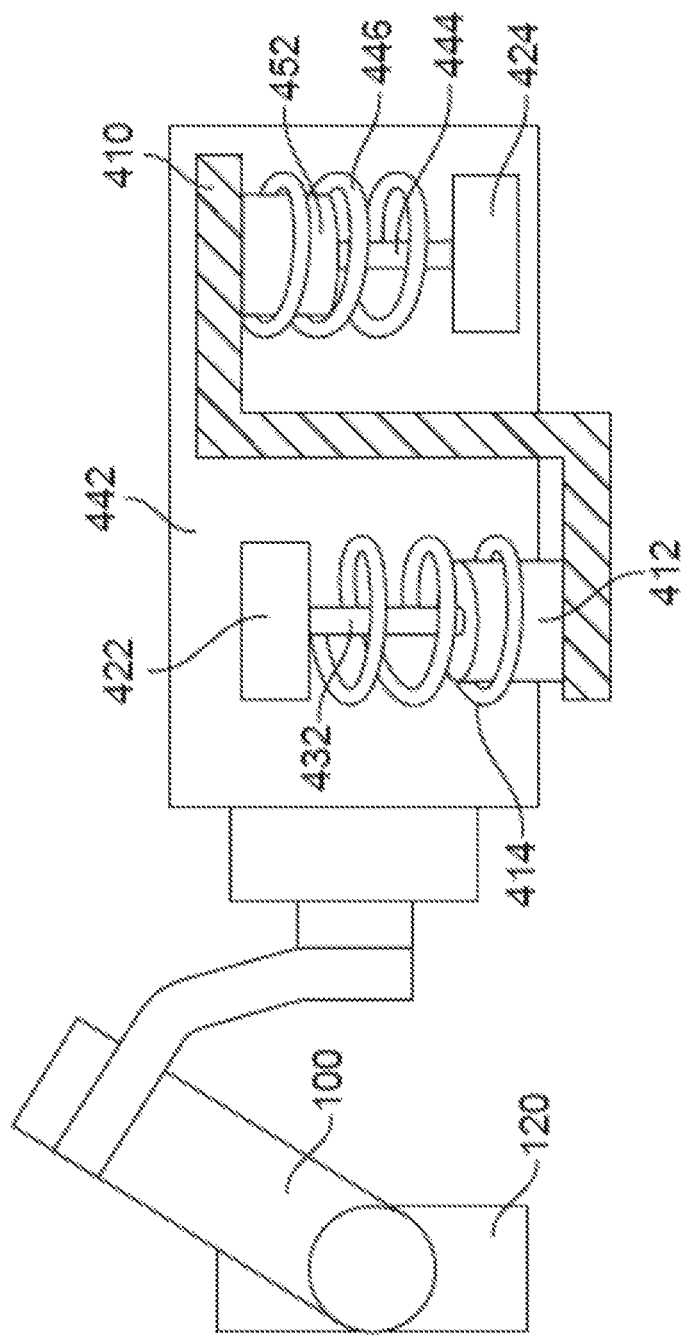
FIG. 5 is a cross sectional view of an embodiment of the connection mechanism between the aerial vehicle and the gimbal.
Figure 6:
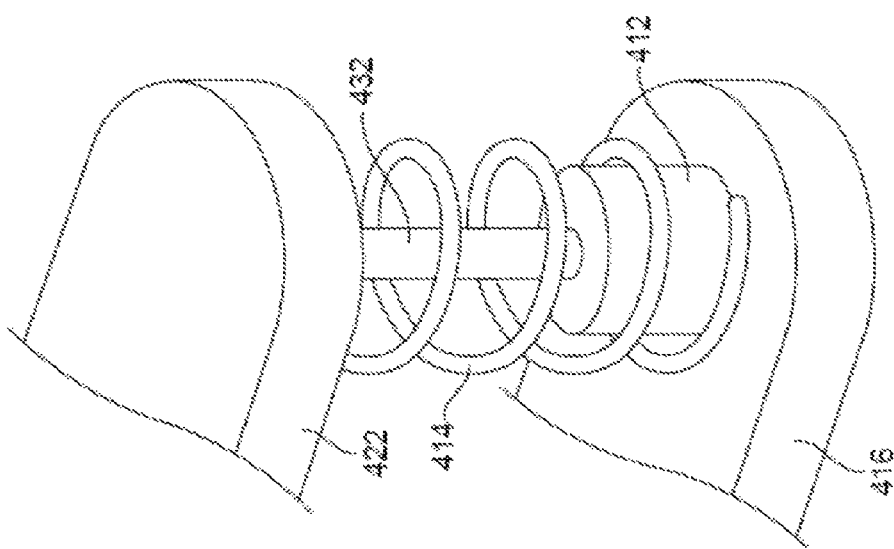
FIG. 6 is a zoomed in view of an embodiment of a connection point between a gimbal sleeve and a vehicle chassis.

FIG. 4 illustrates an exploded view of a first embodiment of a damping mechanism for connecting the aerial vehicle 200 and the gimbal 100. FIG. 5 illustrates a cross-sectional view of the damping mechanism. FIG. 6 illustrates a zoomed in view of portion of the damping mechanism. FIGS. 4-6 are described together herein for clarity and convenience. FIGS. 4-6 are simplified for illustrative purposes, and thus the shapes, relative sizes, and relative positions of the components of the damping connection may vary.

As illustrated, a vehicle chassis 410 may comprise a portion of the housing 230 (e.g., a front portion or a rear portion) includes a floor surface 416, a ceiling surface 418 substantially parallel to the floor surface, and various side wall surfaces. The floor surface 416 and ceiling surface 418 may each include multiple segments, which may be discontinuous. A pair of lower dampers 412 may be coupled to the floor surface 416. In an embodiment, the lower dampers 412 may be positioned near a front end of the aerial vehicle 200 where the gimbal connects 100 (e.g., as shown in FIG. 2). The lower dampers 412 may include a left-side damper 412-a and a right-side damper 412-b on either side of the aerial vehicle 200 (e.g., when viewed from the front). Upper dampers 452 may be similarly coupled to the ceiling surface 418. In an embodiment, the upper dampers 452 may be positioned behind the lower dampers 412 when viewed from the front (e.g., closer to the rear of the aerial vehicle 200). The upper dampers 452 may similarly include a left-side damper 452-a and a right-side damper 452-b on either side of the aerial vehicle 200 (when viewed from the front).

A gimbal sleeve 420 may at least partially extend into the vehicle chassis 410 between the floor surface 416 and the ceiling surface 418. The gimbal sleeve 420 may include a tube 442 structured to mate with the mount connector 304 of the gimbal 100 described above. The tube 442 may have a longitudinal axis 432 through a center of the circular cross-section of the tube 442. When the gimbal sleeve 420 (having the gimbal 100, camera 120, and camera frame 130 attached) is coupled with the gimbal chassis 410 at an equilibrium position, the longitudinal axis 432 may be substantially parallel to the floor surface 416 and the ceiling surface 418. A pair of upper flanges 422 (e.g., a left upper flange 422-a and a right upper flange 422-b) may extend in opposite directions from the cylindrical tube 442. The upper flanges 422 may be aligned along an upper axis 434 that is substantially perpendicular to the longitudinal axis 432 of the cylindrical tube 442 and is substantially parallel to the floor surface 416 and the ceiling surface 418 when the gimbal sleeve 420 is at an equilibrium position. The upper axis 434 may furthermore be offset in an upper direction (e.g., towards the ceiling surface 418) from the longitudinal axis 432 of the cylindrical tube 442. A pair of lower flanges 424 (e.g., a left lower flange 424-a and a right lower flange 424-b) may extend in opposite directions from the cylindrical tube 442 and may be aligned along a lower axis 436 that is substantially perpendicular to the longitudinal axis 432 of the cylindrical tube 442 and is substantially parallel to the floor surface 416 and the ceiling surface 418 of the chassis 410 when the gimbal sleeve 420 is at an equilibrium position relative to the chassis 410. The lower axis 436 may be offset in a lower direction (e.g., towards the floor surface 416) from the longitudinal axis 432 of the cylindrical tube 442. Upper pins 432 (e.g., a left upper pin 432-a and a right upper pin 432-b) may extend from the respective upper flanges 422 towards the floor surface 416 and mate with the respective lower dampers 412. Lower pins 444 (e.g., a left lower pin 444-a and a right lower pin 444-b) may extend from the respective lower flanges 424 and mate with the respective upper dampers 452. Upper springs 414 (e.g., a left upper spring 414-a and a right upper spring 414-b) may be positioned around each of the respective upper pins 432 and lower dampers 412 and may be compressed between the respective upper flanges 422 and the floor surface 416. Similarly, lower springs 446 (e.g., a left lower spring 446-a and a right lower spring 446-b) may be positioned around each of the respective lower pins 444 and upper dampers 452 may be compressed between the lower flanges 424 and the ceiling surface 418 of the chassis 410. The upper springs 414 and lower springs 446 may be compressive springs.

In an embodiment, the pins 432, 444 comprise a shaft with ball end that mates with a corresponding socket of respective dampers 452, 412. The ball ends may have rotational freedom of motion within the corresponding socket and may also move vertically and/or laterally within the sockets. In other embodiments, the sockets may be configured to only enable vertical motion of the pins 432, 444 while restricting rotational and/or lateral movement. In an embodiment, the sockets include a fluid-filled chamber (e.g., oil-filled) that absorbs vibrations of the pin 432, 444.

Figure 7A:
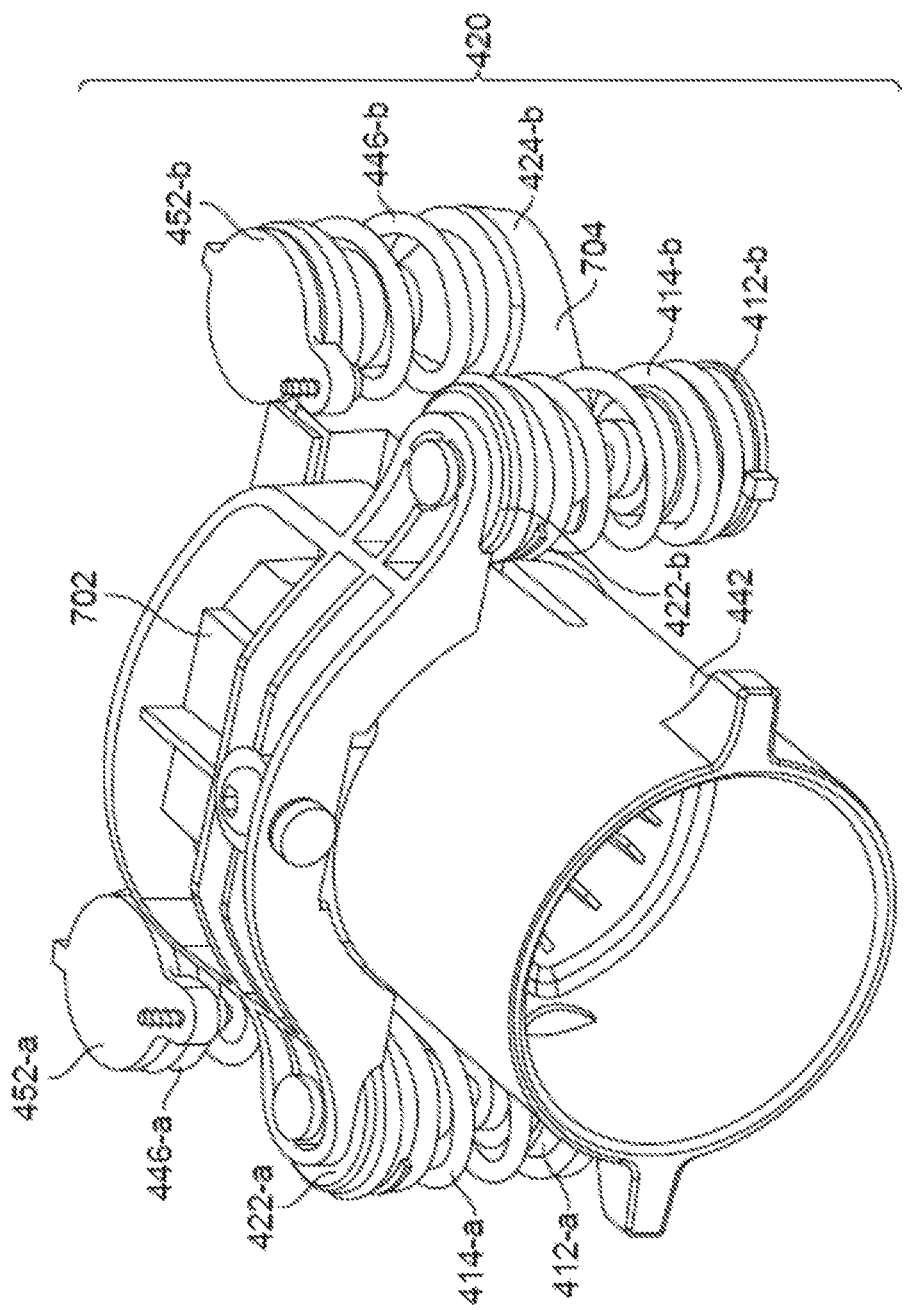
FIG. 7A-B are perspective views of an embodiment of a gimbal sleeve.
Figure 7B:
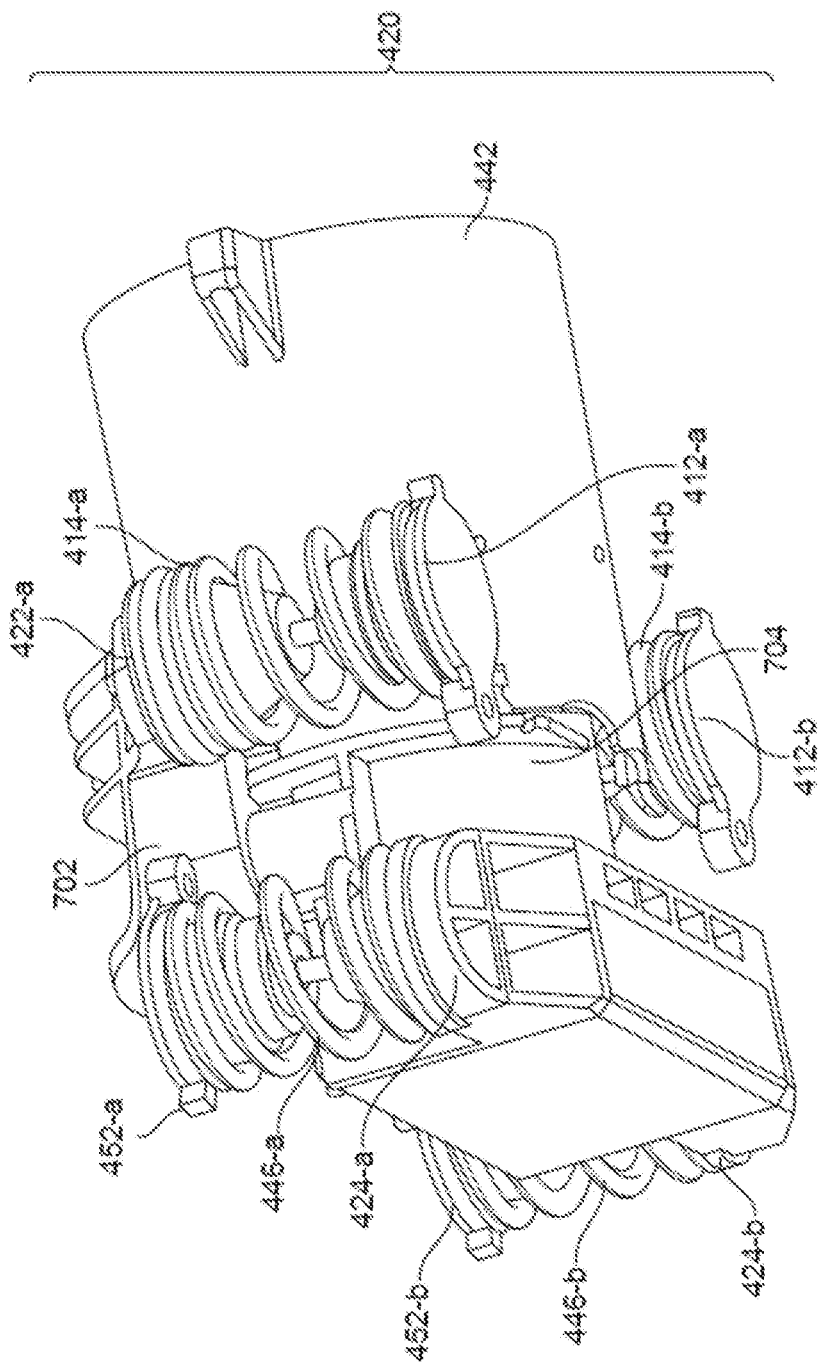

FIGS. 7A-B illustrate perspective views of an assembled gimbal sleeve 420. FIGS. 7A-B illustrate the gimbal sleeve 420 in more detail than in FIGS. 4-6, but the description of the components described above may also apply to FIGS. 7A-B. FIGS. 7A-B also illustrate a particular implementation in which the upper flanges 422 are part of an upper brace 702 (not shown in FIGS. 4-6) that is attached above the tube 442. For example, in one embodiment the upper brace 702 may partially cover the top of the tube 442 with the upper flanges 442 extending horizontally beyond the diameter of the tube 442.

Furthermore, FIGS. 7A-B illustrate a particular implementation in which the lower flanges 424 are part of a lower brace 704 (not shown in FIGS. 4-6) that is attached to the tube 442. For example, in one embodiment, the lower brace 704 may include an inner tube portion that extends into and couples with the tube 442 and furthermore includes a connecting portion that may be connected to the upper brace 702. The upper brace 702 and lower brace 704 may provide structural support for the gimbal sleeve 420.

Figure 8:
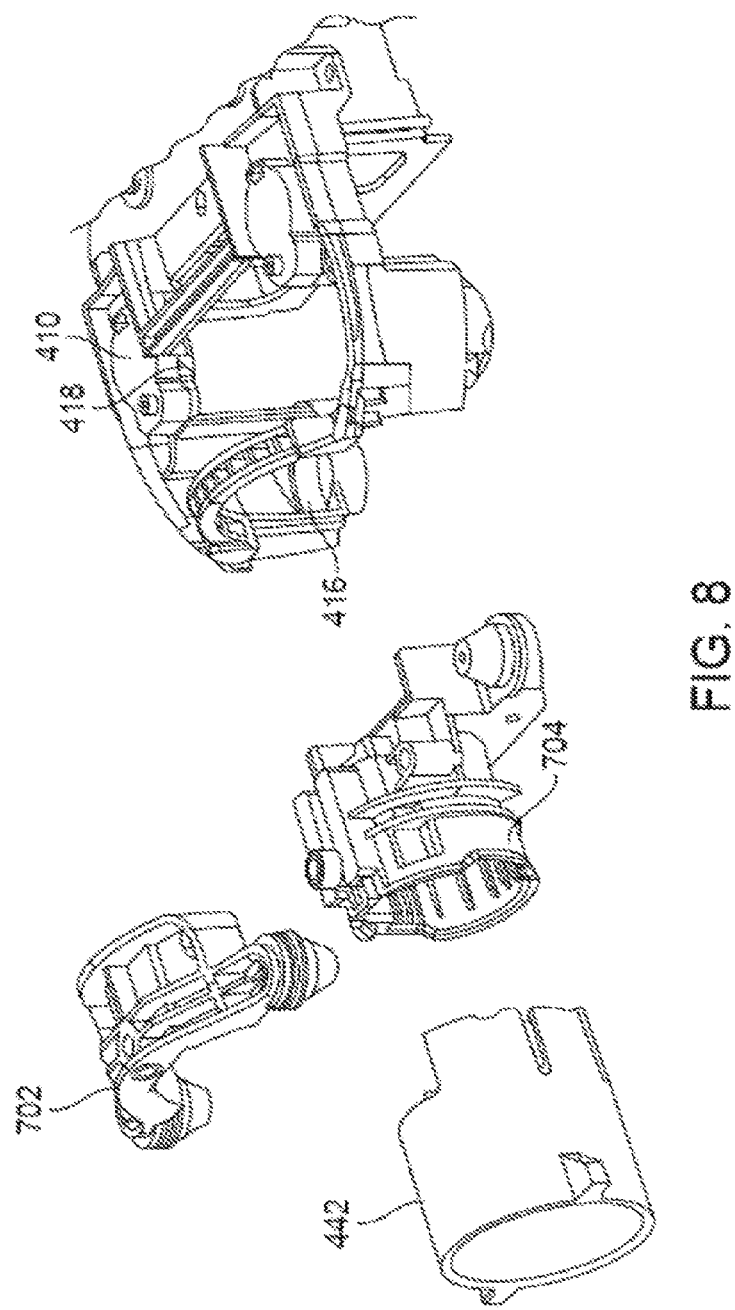
FIG. 8 is an exploded view of an embodiment of a gimbal sleeve and vehicle chassis.
Figure 9A:
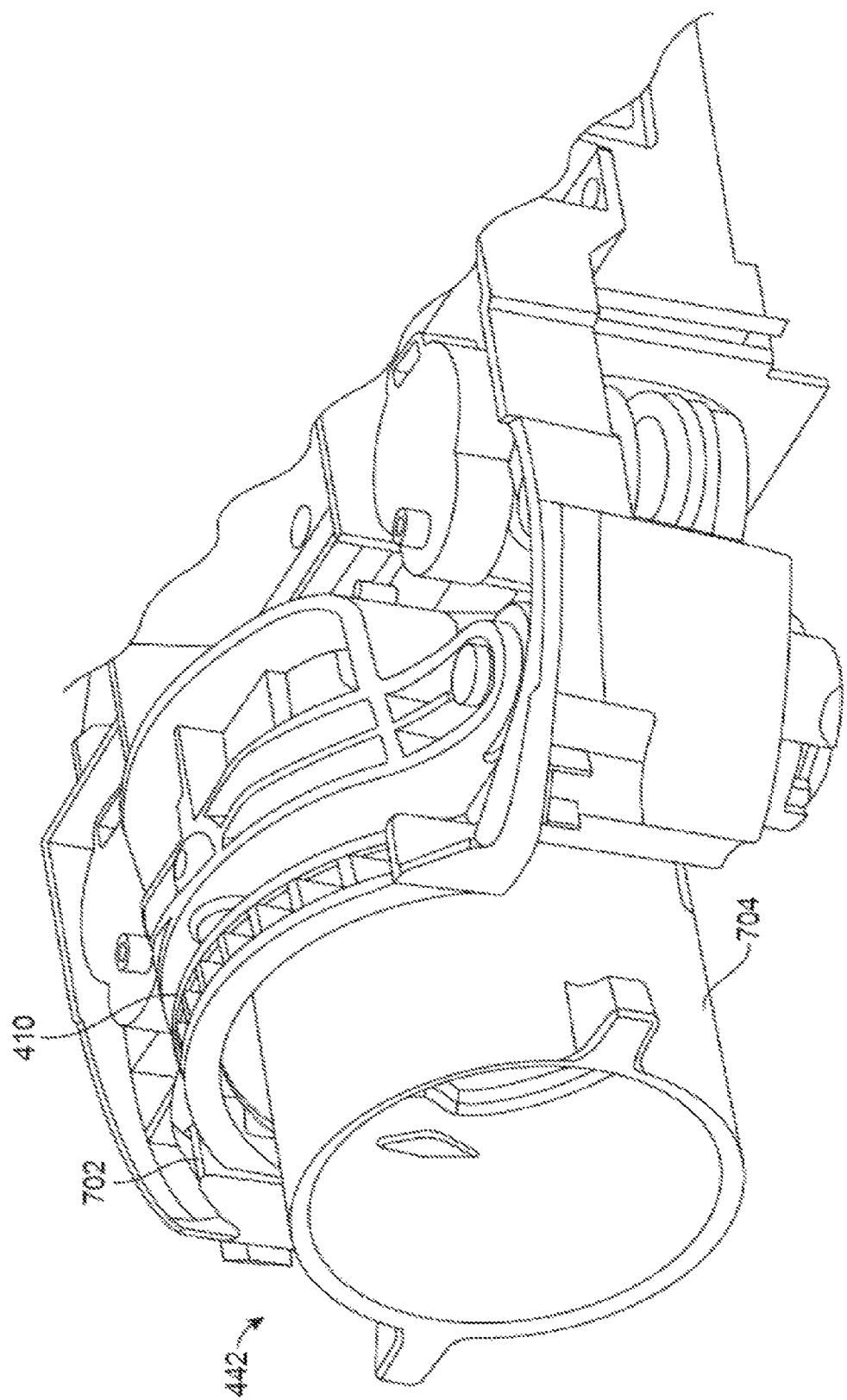
FIGS. 9A-B are perspective views of an embodiment of a vehicle chassis connected to a gimbal sleeve.
Figure 9B:
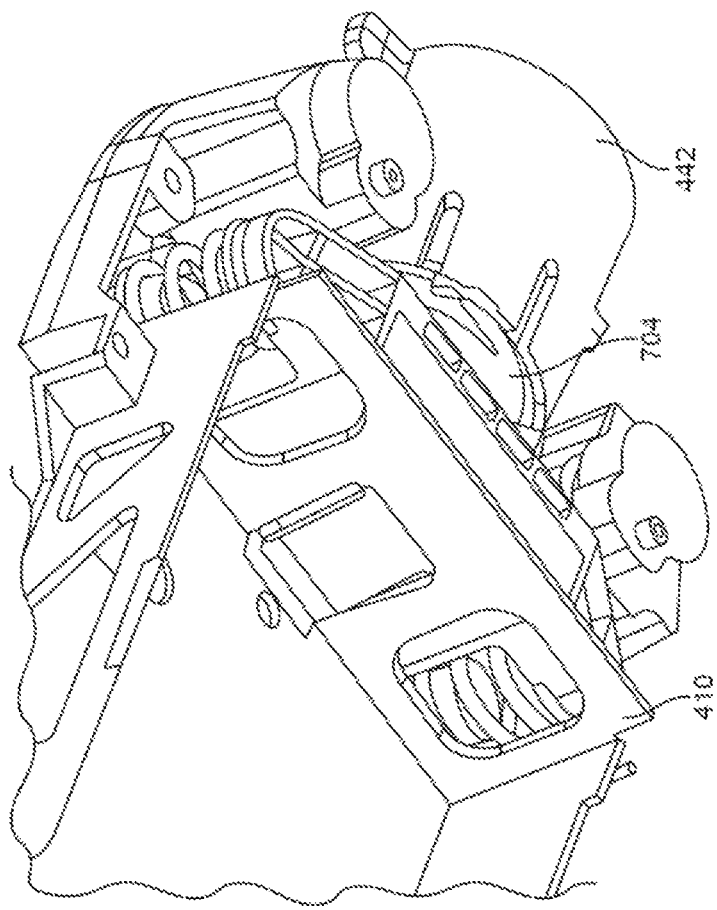

FIG. 8 illustrates an exploded view showing the tube 442, upper brace 702, lower brace 704 and vehicle chassis 410, while omitting other components such as the dampers 412, 452, pins, 432, 444, and springs 414, 446 for clarity of illustration. FIGS. 9A-B illustrate detailed views of the assembled gimbal sleeve 420 and vehicle chassis 410. As seen in FIGS. 9A-B the gimbal sleeve 420 may be positioned within an opening of the vehicle chassis 410 structured such that the connection points between the dampers 412, 452, springs 446, 414 and pins 432, 444 represent the only connection points between the gimbal sleeve 420 and the vehicle chassis 410. This connection configuration enables the gimbal sleeve 420 to float within the vehicle chassis 410 such that it has freedom of motion in each of the yaw, pitch, and roll directions. The dampers 412, 452, and springs 446, 414 operate to reduce the amount of vibrations transferred from the aerial vehicle to the gimbal 100 (and to the camera 120) and restore the gimbal sleeve 420 to an equilibrium position in response to external vibrations.

Figure 10A:
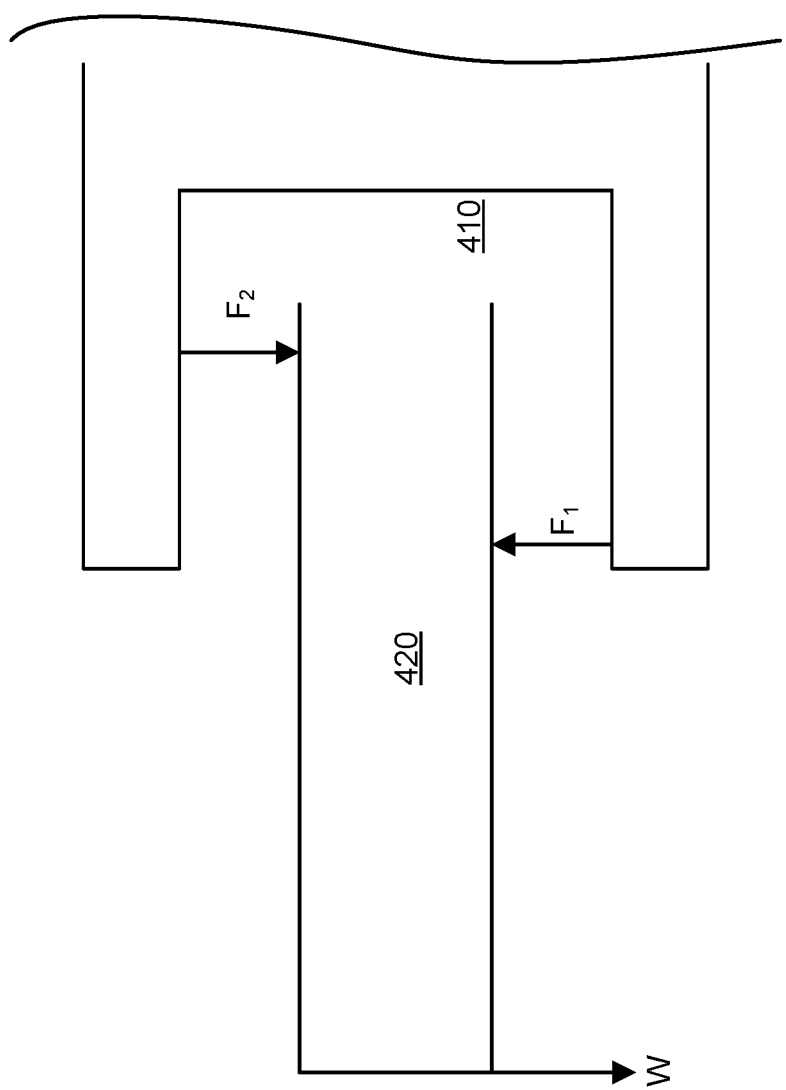
FIG. 10A is a first free body diagram illustrating examples of forces applied to a gimbal sleeve.

FIG. 10A is a simplified free-body diagram illustrating forces on the gimbal sleeve 420. In the diagram, W represents the weight of the gimbal sleeve 420, gimbal 100, camera 120 and any other attached accessories such as the camera frame 130 or other housing, $F_1$ represents the force of the upper springs 414, and $F_2$ represents the force of the lower springs 446. As can be seen from FIG. 10A, the gimbal sleeve 420 may behave as a cantilever. The spring constants and damper designs may be selected in order to return the gimbal sleeve 420 to an equilibrium position absent external forces.

Figure 10B:
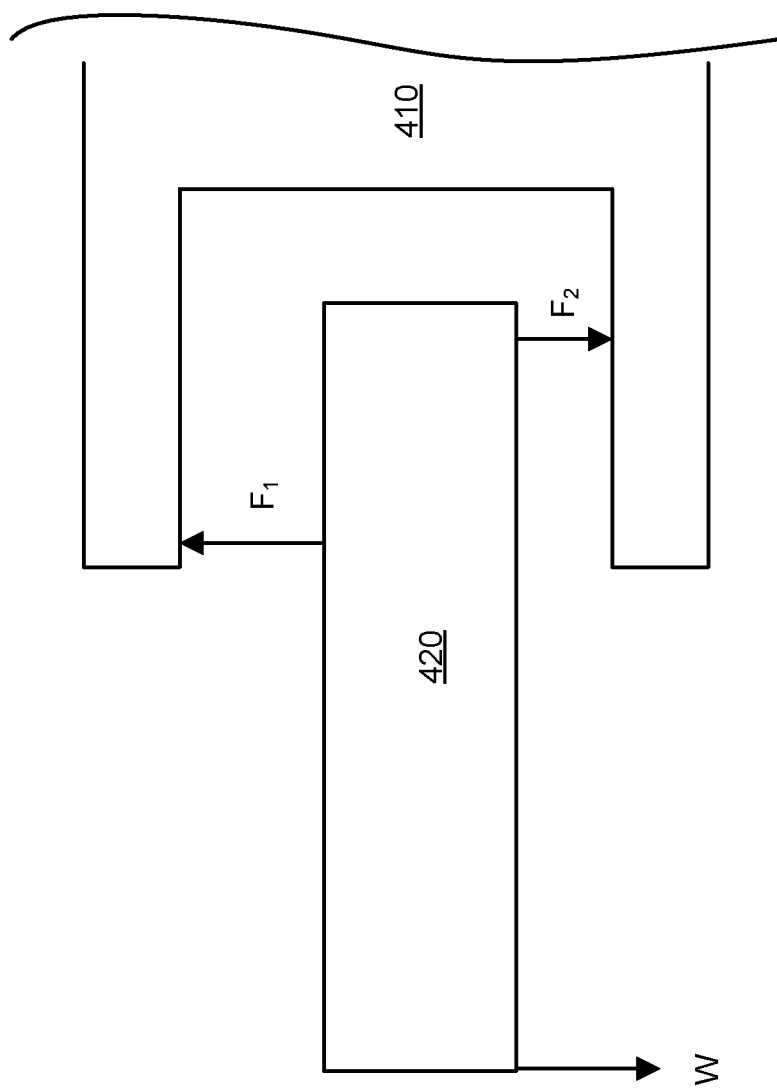
FIG. 10B is a second free body diagram illustrating examples of forces applied to a gimbal sleeve.

In alternative embodiments, the positions of the upper flanges 422 (and corresponding upper pins 432, upper springs 414, and lower dampers 412) and lower flanges 424 (and corresponding lower pins 444, lower springs 446, and upper dampers 452) may be reversed such that the lower flanges 424 (and corresponding components) are near the front of the aerial vehicle 200 and the upper flanges 422 (and corresponding components) are behind the lower flanges 424 (towards the rear of the aerial vehicle 200). In this embodiment, the compressive springs 414, 446 may be replaced with tension springs. FIG. 10B illustrates a simplified free body diagram for this configuration. Here, a force $F_1$ may be applied by a first set of tension springs to pull the gimbal sleeve 420 towards the ceiling surface of the vehicle chassis 410 at a first set of attachments points near the front of the vehicle 200 and a force $F_2$ may be applied by a second set of tension springs to pull the gimbal sleeve 420 towards the floor surface of the vehicle chassis 410 at a second set of attachments points behind the first set of attachment points.

In other alternative embodiments, the gimbal sleeve 420 and vehicle chassis 410 may have only two damped connections as described above instead of four. For example, damped connections may exist with the floor surface of the aerial vehicle 410 but not the ceiling surface 420 or vice versa.

In yet other embodiments, different types of dampers 412, 452 may be used that are not necessarily fluid-based. Furthermore, different types of damped connections may be used for the attachment points between the flanges 422, 424 and the ceiling surface 418 and floor surface 416 that does not necessarily include a pin 432, 444 with a ball end, dampers 412, 452 with ball sockets, and springs 414, 446.

Alternative Damping Connection with Pivot Point

Figure 11A:
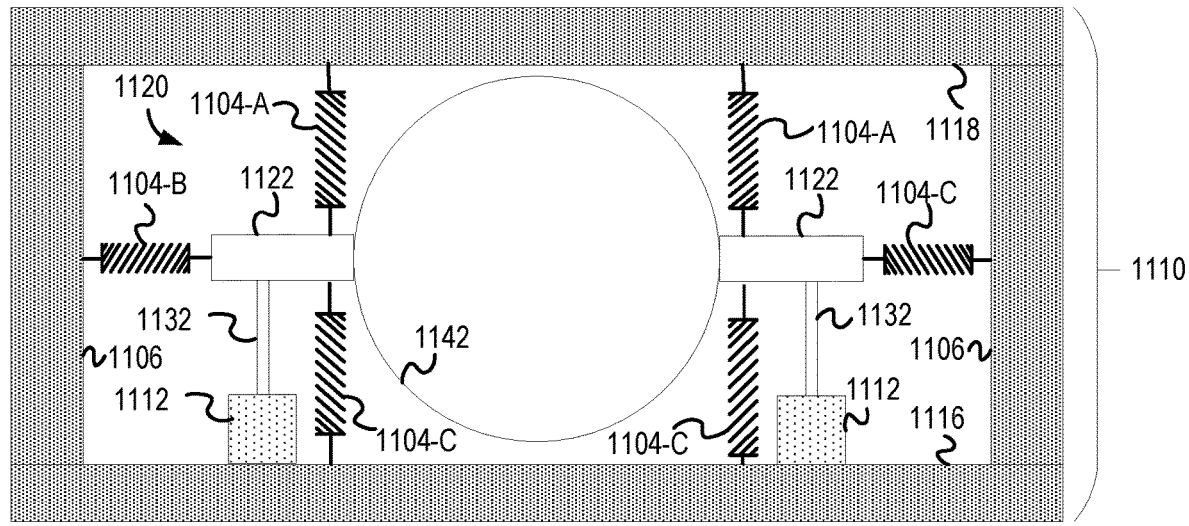
FIG. 11A illustrates a front view of an alternative embodiment of the gimble sleeve using a ball joint.
Figure 11B:
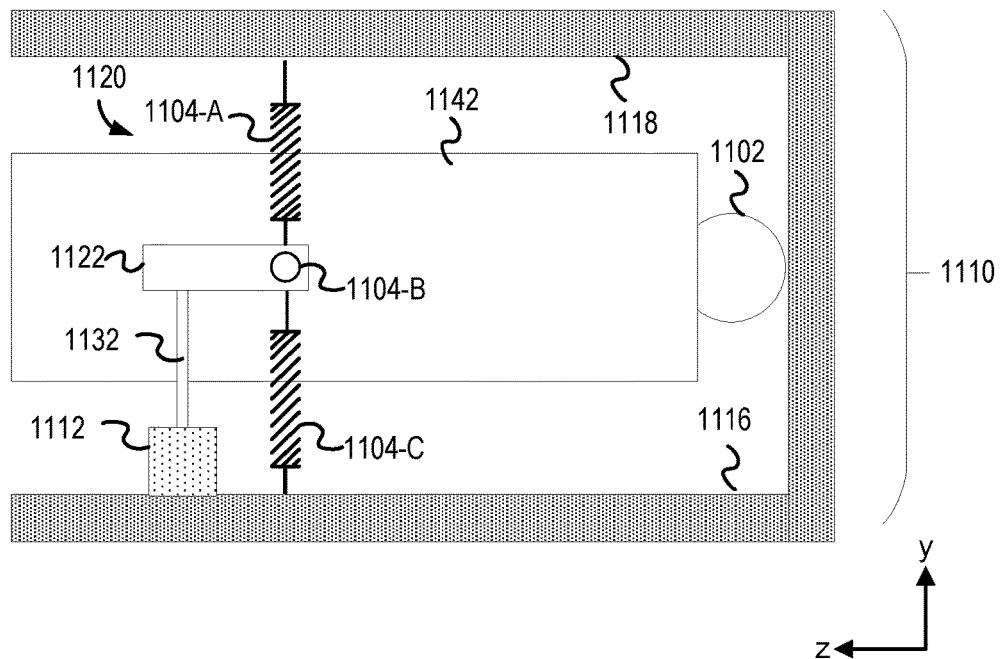
FIG. 11B illustrates a side view of the alternative embodiment of the gimble sleeve.

FIGS. 11A-B illustrate a front view and a side view respectively of an alternative embodiment of a damping mechanism for connecting a gimbal sleeve 1120 to an aerial vehicle chassis 1110. In this embodiment, instead of the gimbal sleeve 1120 completely floating, a ball joint 1102 and elastic diaphragm connect a rear center portion of the gimbal sleeve 1120 (intersected by the longitudinal axis of the tube 1142) to a surface of the vehicle chassis 1110 perpendicular to the floor surface 1116 and ceiling surface 1118 and also perpendicular to the longitudinal axis of the tube 1142 of the gimbal sleeve 1120. The gimbal sleeve 1120 may pivot around the ball joint 1102, thus allowing freedom of motion in the left/right and up/down directions (e.g., the x-y directions). In an embodiment, the gimbal sleeve 1120 does not have freedom of motion in the front/rear direction along the longitudinal axis of the tube 11421 (e.g., the z direction). Alternatively, the rear ball joint 1102 may have an internal damper or spring to allow freedom of motion in the longitudinal direction. In an embodiment, the rear flanges, springs, and upper dampers described above may be omitted in place of the ball joint connection. In an embodiment, lower dampers 1112 (similar to lower dampers 412 described above) on the vehicle chassis 1110 may connect to attachment points 1122 (e.g., similar to flanges 422) on the gimbal sleeve 1120 in a similar manner as described above in order to damp vibrations. In an embodiment, instead of a single compression spring around the pins and dampers, a set of three tension elements (e.g., springs) 1104-A, 1104-B, 1104-C on each side of the gimbal sleeve 1120 may be used. Particularly, a first tension element 1104-A (per side) connects vertically between an attachment point 1122 on the gimbal sleeve and the upper surface 1118 of the aerial vehicle chassis 1110, a second tension element 1104-C (per side) connects vertically between the attachment point 1122 on the gimbal sleeve and a lower surface 1116 of the aerial vehicle chassis 1110, and a third tension element 1104-B (per side) connects horizontally between the attachment point 1122 and a side surface 1106 of the aerial vehicle chassis 1110. In an embodiment, these tension elements 1104 may comprise tension springs to apply respective forces to pull the gimbal sleeve 1120 back towards the equilibrium position when it is displaced. A beneficial effect of this configuration is that the spring constants for the vertical and horizontal springs 1104 may be different, thus enabling motion in the horizontal and vertical directions to be independently controlled.

In an alternative embodiment, a compressible and/or stretchable rubber may be used as the tension elements 1104. For example, the tension elements 1104 may each comprise a stretchable rubber element. Alternatively, a single T-shaped stretchable rubber element may be used in place of the three separate tension elements 1104. Here, the rubber piece may comprises at least a vertical portion connecting the upper and lower surfaces 1118, 1116 to the attachment point 1122 on the gimbal sleeve 1120 and a horizontal portion connecting the side surface 1106 to the attachment point 1122.

Example Camera Architecture

Figure 12:
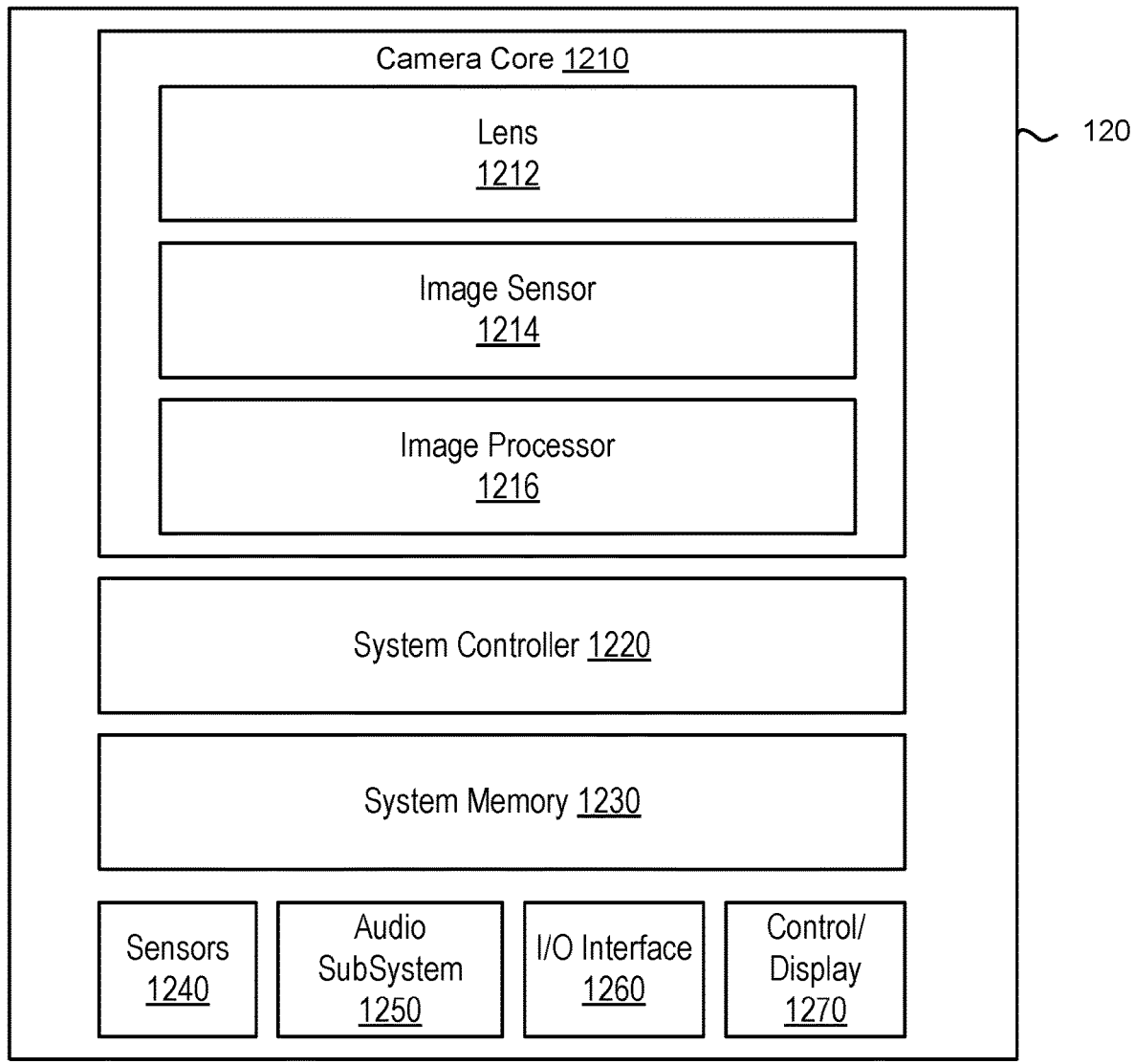
FIG. 12 illustrates a block diagram of an example camera architecture.

FIG. 12 illustrates a block diagram of an example camera architecture. The example camera architecture 1205 corresponds to an architecture for the camera, e.g., 120. In one embodiment, the camera 120 is capable of capturing spherical or substantially spherical content. As used herein, spherical content may include still images or video having spherical or substantially spherical field of view. For example, in one embodiment, the camera 120 captures video having a 360° field of view in the horizontal plane and a 180° field of view in the vertical plane. Alternatively, the camera 120 may capture substantially spherical images or video having less than 360° in the horizontal direction and less than 180° in the vertical direction (e.g., within 10% of the field of view associated with fully spherical content). In other embodiments, the camera 120 may capture images or video having a non-spherical wide angle field of view.

As described in greater detail below, the camera 120 can include sensors 1240 to capture metadata associated with video data, such as timing data, motion data, speed data, acceleration data, altitude data, GPS data, and the like. In an example embodiment, location and/or time centric metadata (geographic location, time, speed, etc.) can be incorporated into a media or image file together with the captured content in order to track over time the location of the camera 120 or the subject being recorded. This metadata may be captured by the camera 120 itself or by another device (e.g., a mobile phone, the aerial vehicle 200, or a data tracker worn by a subject such as a smart watch or fitness tracker equipped with tracking software or a dedicated radio frequency tracker) proximate to the camera 120. In one embodiment, the metadata may be incorporated with the content stream by the camera 120 as the spherical content is being captured. In another embodiment, a metadata file separate from the video or image file may be captured (by the same capture device or a different capture device) and the two separate files can be combined or otherwise processed together in post-processing. It is noted that these sensors 1240 can be in addition to sensors in a telemetric subsystem of the aerial vehicle 200. In embodiments in which the camera 120 is integrated with the aerial vehicle 200, the camera need not have separate individual sensors, but rather could rely upon the sensors integrated with the aerial vehicle 200 or another external device.

In the embodiment illustrated in FIG. 12, the camera 120 may comprise a camera core 1210 comprising a lens 1212, an image sensor 1214, and an image processor 1216. The camera 120 additionally may include a system controller 1220 (e.g., a microcontroller or microprocessor) that controls the operation and functionality of the camera 120 and system memory 1230 configured to store executable computer instructions that, when executed by the system controller 1220 and/or the image processors 1216, perform the camera functionalities described herein. In some embodiments, a camera 120 may include multiple camera cores 1210 to capture fields of view in different directions which may then be stitched together to form a cohesive image. For example, in an embodiment of a spherical camera system, the camera 120 may include two camera cores 1210 each having a hemispherical or hyper hemispherical lens that each capture a hemispherical or hyper-hemispherical field of view which are stitched together in post-processing to form a spherical image.

The lens 1212 can be, for example, a wide angle lens, hemispherical, or hyper hemispherical lens that focuses light entering the lens to the image sensor 1214 which captures images and/or video frames. The image sensor 1214 may capture high-definition images having a resolution of, for example, 720p, 1080p, 4 k, or higher. In one embodiment, spherical video is captured in a resolution of 5760 pixels by 2880 pixels with a 360° horizontal field of view and a 180° vertical field of view. For video, the image sensor 1214 may capture video at frame rates of, for example, 30 frames per second, 60 frames per second, or higher.

The image processor 1216 performs one or more image processing functions of the captured images or video. For example, the image processor 1216 may perform a Bayer transformation, demosaicing, noise reduction, image sharpening, image stabilization, rolling shutter artifact reduction, color space conversion, compression, or other in-camera processing functions. The image processor 1216 may be configured to perform real-time stitching of images, for example, when images are captured from two or more cameras configured to capture images. Such example configurations may include, for example, an activity camera (which may include a spherical image capture camera) with image sensors, each with a substantially different field of view (FOV), but where there may be some overlap where the images can be stitched together. Processed images and video may be temporarily or persistently stored to system memory 1230 and/or to a non-volatile storage, which may be in the form of internal storage or an external memory card.

An input/output (I/O) interface 1260 may transmit and receive data from various external devices. For example, the I/O interface 1260 may facilitate the receiving or transmitting video or audio information through an I/O port. Examples of I/O ports or interfaces include USB ports, HDMI ports, Ethernet ports, audio ports, and the like. Furthermore, embodiments of the I/O interface 1260 may include wireless ports that can accommodate wireless connections. Examples of wireless ports include Bluetooth, Wireless USB, Near Field Communication (NFC), cellular (mobile) communication protocols, short range Wifi, etc., and the like. The I/O interface 1260 may also include an interface to synchronize the camera 120 with other cameras or with other external devices, such as a remote control, a second camera, a smartphone, a client device, or a video server.

A control/display subsystem 1270 includes various control and display components associated with operation of the camera 120 including, for example, LED lights, a display, buttons, microphones, speakers, and the like. The audio subsystem 1250 includes, for example, one or more microphones and one or more audio processors to capture and process audio data correlated with video capture. In one embodiment, the audio subsystem 1250 includes a microphone array having two or more microphones arranged to obtain directional audio signals.

Sensors 1240 may capture various metadata concurrently with, or separately from, video capture. For example, the sensors 1240 may capture time-stamped location information based on a global positioning system (GPS) sensor, and/or an altimeter. Other sensors 1240 may be used to detect and capture orientation of the camera 120 including, for example, an orientation sensor, an accelerometer, a gyroscope, or a magnetometer. Sensor data captured from the various sensors 1240 may be processed to generate other types of metadata. For example, sensor data from the accelerometer may be used to generate motion metadata, comprising velocity and/or acceleration vectors representative of motion of the camera 120. Furthermore, sensor data from the aerial vehicle 200 and/or the gimbal 100 may be used to generate orientation metadata describing the orientation of the camera 120. Sensor data from a GPS sensor can provide GPS coordinates identifying the location of the camera 120, and the altimeter can measure the altitude of the camera 120.

In one example embodiment, the sensors 1240 may be rigidly coupled to the camera 120 such that any motion, orientation or change in location experienced by the camera 120 is also experienced by the sensors 1240. The sensors 1240 furthermore may associate one or more time stamps representing when the data was captured by each sensor. In one embodiment, the sensors 1240 automatically begin collecting sensor metadata when the camera 120 begins recording a video.

Additional Considerations

The processes and functions described herein attributed to the gimbal 100, camera 120, mount platform 110, aerial vehicle 200, or other devices may be implemented via hardware, software, firmware, or a combination of these. In embodiments described herein, each of the above-named devices may include one or more processors and one or more non-transitory computer-readable storage mediums. The non-transitory computer-readable storage mediums may store instructions executable by one or more of the processors that when executed cause the processor to carry out the processes and functions of the respective devices described herein.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors, that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for the disclosed embodiments. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. An aerial vehicle comprising:
a chassis;
one or more dampers coupled to the chassis; and
a gimbal sleeve configured to couple to a gimbal of the aerial vehicle, the gimbal sleeve at least partially extending into the chassis, the gimbal sleeve comprising:
a tube structured to couple with a gimbal connector of the gimbal, and an attachment mechanism configured to couple the tube to the chassis, wherein the attachment mechanism comprises:
one or more attachment points;
one or more pins; and
one or more tension elements; wherein the one or more pins extend from the one or more attachment points towards a lower surface of the chassis, further wherein the one or more pins mate with the one or more dampers.

2. The aerial vehicle of claim 1, wherein the one or more attachment points extend in opposite directions from an outer surface of the tube towards one or more side surfaces of the chassis.

3. The aerial vehicle of claim 1, wherein the one or more pins each comprise respective ball ends that mate with respective sockets of the one or more dampers, each ball end having rotational freedom of motion with respect to each corresponding socket.

4. The aerial vehicle of claim 1, wherein the one or more tension elements apply a tension force to pull the gimbal sleeve towards an equilibrium position.

5. The aerial vehicle of claim 1, wherein the one or more tension elements comprise:
a first pair of springs coupled between the one or more attachment points and an upper surface of the chassis;
a second pair of springs coupled between the one or more attachment points and a lower surface of the chassis; and
a third pair of springs coupled between the one or more attachment points and one or more side surfaces of the chassis.

6. The aerial vehicle of claim 1, wherein the one or more tension elements comprise:
a first pair of stretchable rubber elements coupled between the one or more attachment points and an upper surface of the chassis;
a second pair of stretchable rubber elements coupled between the one or more attachment points and a lower surface of the chassis; and
a third pair of stretchable rubber elements coupled between the one or more attachment points and one or more side surfaces of the chassis.

7. The aerial vehicle of claim 1, wherein the one or more tension elements comprise:
a pair of T-shaped unibody stretchable elements having respective first arms coupled between the one or more attachment points and an upper surface of the chassis, respective second arms coupled between the one or more attachment points and a lower surface of the chassis, and respective third arms coupled between the one or more attachment points and one or more side surfaces of the chassis.

8. The aerial vehicle of claim 1, wherein the one or more dampers each comprise a fluid-filled chamber to absorb motion of the one or more pins.

9. The aerial vehicle of claim 1, wherein the attachment mechanism comprises:
a ball joint configured to couple an end of the tube to a back surface of the chassis.

10. The aerial vehicle of claim 9, wherein the ball joint comprises a ball and socket connector that enables the gimbal sleeve to move laterally and vertically with respect to the chassis and prevents the gimbal sleeve from moving longitudinally with respective to the chassis.

11. The aerial vehicle of claim 10, wherein the ball joint further comprises a damper that damps longitudinal motion of the gimbal sleeve with respect to the chassis.

12. A gimbal sleeve for an aerial vehicle, comprising:
a tube structured to couple with a gimbal connector of a gimbal of the aerial vehicle, the tube including one or more flanges extending outwards from an outer surface of the tube; and
an attachment mechanism configured to couple the tube to a chassis of the aerial vehicle,
wherein the attachment mechanism comprises:
one or more dampers;
one or more tension elements; and
one or more pins, wherein the one or more pins are configured to interface with the one or more dampers via the one or more tension elements to couple the one or more flanges of the tube to the chassis.

13. The gimbal sleeve of claim 12, wherein the one or more pins each comprise respective ball ends that mate with respective sockets of the one or more dampers, each ball end having rotational freedom of motion with respect to each corresponding socket.

14. The gimbal sleeve of claim 12, wherein the one or more tension elements apply a tension force to pull the gimbal sleeve towards an equilibrium position.

15. The gimbal sleeve of claim 12, wherein the one or more tension elements comprise any of a set of springs and a set of stretchable rubber elements.

16. A system comprising:
an aerial vehicle including a chassis;
a gimbal including a connector; and
a gimbal sleeve configured to couple to the gimbal via the connector, the gimbal sleeve comprising:
a tube structure and
an attachment mechanism configured to couple the tube structure to the chassis, the attachment mechanism comprising:
one or more attachment points;
one or more pins comprising ball ends that mate with sockets of one or more dampers so that the ball ends have rotational freedom of motion with respect to the sockets; and
one or more tension elements.

17. The system of claim 16, wherein the one or more pins are configured to interface between the one or more attachment points and the chassis via the one or more dampers and the one or more tension elements.

18. The aerial vehicle of claim 1, wherein the one or more attachment points comprise:
   a pair of upper flanges that extend from a top of the tube in opposite directions; and
   a pair of lower flanges that extend from a bottom of the tube in opposite directions.

19. The aerial vehicle of claim 18, wherein one of the one or more pins are connected to and extend from the pair of upper flanges in a first direction and another of the one or more pins are connected to extend from the pair of lower flanges in a second direction that is opposite the first direction.

20. The gimbal sleeve of claim 12, wherein the one or more tension elements are compression springs, and wherein the one or more pins extend through the compression springs.

21. The system of claim 16, wherein the one or more tension elements are configured to generate a force between the gimbal sleeve and the vehicle chassis so that the gimbal sleeve is movable relative to the vehicle chassis, and wherein the one or more tension elements are configured to move the gimbal sleeve into an equilibrium position with the force.

* * * * *